US009871571B2

(12) United States Patent
Kobayashi et al.

(10) Patent No.: US 9,871,571 B2
(45) Date of Patent: Jan. 16, 2018

(54) WIRELESS COMMUNICATION APPARATUS AND WIRELESS COMMUNICATION CONTROL METHOD

(71) Applicant: Panasonic Corporation, Osaka (JP)

(72) Inventors: Masashi Kobayashi, Tokyo (JP); Naganori Shirakata, Kanagawa (JP); Tomoya Urushihara, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 15/645,864

(22) Filed: Jul. 10, 2017

(65) Prior Publication Data

US 2017/0317729 A1 Nov. 2, 2017

Related U.S. Application Data

(63) Continuation of application No. PCT/JP2016/001189, filed on Mar. 4, 2016.

(30) Foreign Application Priority Data

Mar. 27, 2015 (JP) ................................ 2015-065608

(51) Int. Cl.
*H04B 7/06* (2006.01)
*H04W 64/00* (2009.01)
(Continued)

(52) U.S. Cl.
CPC ........ *H04B 7/0617* (2013.01); *H04W 64/006* (2013.01); *H04B 7/043* (2013.01); *H04W 24/08* (2013.01)

(58) Field of Classification Search
CPC .. H04W 64/006; H04W 24/08; H04B 7/0617; H04B 7/043
See application file for complete search history.

(56) References Cited

U.S. PATENT DOCUMENTS 5,754,139 A * 5/1998 Turcotte ............... H04B 7/2041 342/372
2004/0014429 A1* 1/2004 Guo ..................... H04B 7/0632 455/73
(Continued)

FOREIGN PATENT DOCUMENTS

JP 2008-278076 A 11/2008
JP 2013-106270 A 5/2013
(Continued)

OTHER PUBLICATIONS

International Search Report of PCT application No. PCT/JP2016/001189 dated Apr. 12, 2016.

*Primary Examiner* — Jean B Corrielus
(74) *Attorney, Agent, or Firm* — Seed IP Law Group LLP

(57) ABSTRACT

A wireless communication apparatus including an antenna, which, in operation, changes a beam pattern by using a plurality of antenna elements, a communicator, which, in operation, performs wireless communication with a communication terminal by using the antenna, quality information acquisition circuitry, which, in operation, acquires quality information indicating a communication quality of the wireless communication, movement information acquisition circuitry, which, in operation, acquires movement information indicating movement of a relative position of the communication terminal with respect to the antenna, and beam control circuitry, which, in operation, controls the beam pattern to be changed by the antenna on the basis of the acquired quality information and movement information.

11 Claims, 21 Drawing Sheets

(51) Int. Cl.
*H04W 24/08* (2009.01)
*H04B 7/04* (2017.01)

(56) References Cited

U.S. PATENT DOCUMENTS

| | | | | |
|---|---|---|---|---|
| 2005/0197071 | A1 | 9/2005 | Yoshida et al. | |
| 2006/0094449 | A1* | 5/2006 | Goldberg | H04W 16/28 455/456.6 |
| 2006/0159052 | A1* | 7/2006 | Koga | H04B 7/0667 370/335 |
| 2009/0296663 | A1* | 12/2009 | Wild | H01Q 1/246 370/335 |
| 2010/0151865 | A1* | 6/2010 | Camp, Jr. | H04W 72/046 455/445 |
| 2013/0040655 | A1* | 2/2013 | Keidar | H01Q 1/245 455/456.1 |
| 2014/0055302 | A1* | 2/2014 | Jia | H01Q 3/34 342/372 |
| 2014/0070995 | A1* | 3/2014 | Itagaki | H01Q 3/26 342/372 |
| 2014/0071838 | A1* | 3/2014 | Jia | H04B 7/04 370/252 |
| 2016/0315680 | A1* | 10/2016 | Braun | H04B 7/0617 |

FOREIGN PATENT DOCUMENTS

| | | | |
|---|---|---|---|
| JP | 2014-112898 | A | 6/2014 |
| WO | 2004/066523 | A1 | 8/2004 |

* cited by examiner

| NUMBER OF ANTENNAS USED (431) | BEAM HALF-VALUE ANGLE [deg] (432) | DIFFERENCE BETWEEN RECEPTION POWER AND RECEPTION SENSITIVITY DURING COMMUNICATION [dB] (433) | COMMUNICATION DISTANCE [m] (434) |
|---|---|---|---|
| 1 | 120 | GREATER THAN OR EQUAL TO 15 | LESS THAN 1 |
| 2 | 60 | GREATER THAN OR EQUAL TO 12 AND LESS THAN 15 | GREATER THAN OR EQUAL TO 1 AND LESS THAN 1.5 |
| 4 | 30 | GREATER THAN OR EQUAL TO 9 AND LESS THAN 12 | GREATER THAN OR EQUAL TO 1.5 AND LESS THAN 2.1 |
| 8 | 15 | GREATER THAN OR EQUAL TO 6 AND LESS THAN 9 | GREATER THAN OR EQUAL TO 2.1 AND LESS THAN 3 |
| 16 | 7.5 | LESS THAN 6 | GREATER THAN OR EQUAL TO 3 |

| DEVICE TYPE (511) | PRESENCE OF MOVEMENT (512) |
|---|---|
| DESKTOP PC | NO |
| NOTEBOOK PC | YES |
| SMARTPHONE | YES |

| SPEED (521) | PRESENCE OF MOVEMENT (522) |
|---|---|
| 0 km/h | NO |
| 0 km/h < | YES |

| TRAFFIC TYPE | PRESENCE OF MOVEMENT TO BE TAKEN INTO ACCOUNT |
|---|---|
| Best Effort | NO |
| Video | YES |
| Voice | YES |

| BATTERY-POWERED OPERATION | PRESENCE OF MOVEMENT |
|---|---|
| NO | NO |
| YES | YES |

FIG. 20

| CURRENT BEAMWIDTH (551) | RECOMMENDED BEHAVIOR (552) | PRESENCE OF MOVEMENT (553) | SUBSEQUENT STEP (554) | BEAM PATTERN (555) |
|---|---|---|---|---|
| Narrow Beam | Wide Beam | YES | S1560 | CHANGE TO Wide |
| Narrow Beam | Narrow Beam | NO | S1550 | UNCHANGED |
| Wide Beam | Wide Beam | YES | S1550 | UNCHANGED |
| Wide Beam | Narrow Beam | NO | S1550 | CHANGE TO Narrow |

| | Element ID | Length | Activity | MCS | Link Margin | SNR | Reference Timestamp |
|---|---|---|---|---|---|---|---|
| Octets: | 1 | 1 | 1 | 1 | 1 | 1 | 4 |

| Preferred Action value | Meaning |
|---|---|
| 0 | No change preferred |
| 1 | Change(d) MCS |
| 2 | Decrease(d) transmit power |
| 3 | Increase(d) transmit power |
| 4 | Fast session transfer (FST) |
| 5 | Power conserve mode |
| 6 | Perform SLS |
| 7–255 | Reserved |

Figure 24:
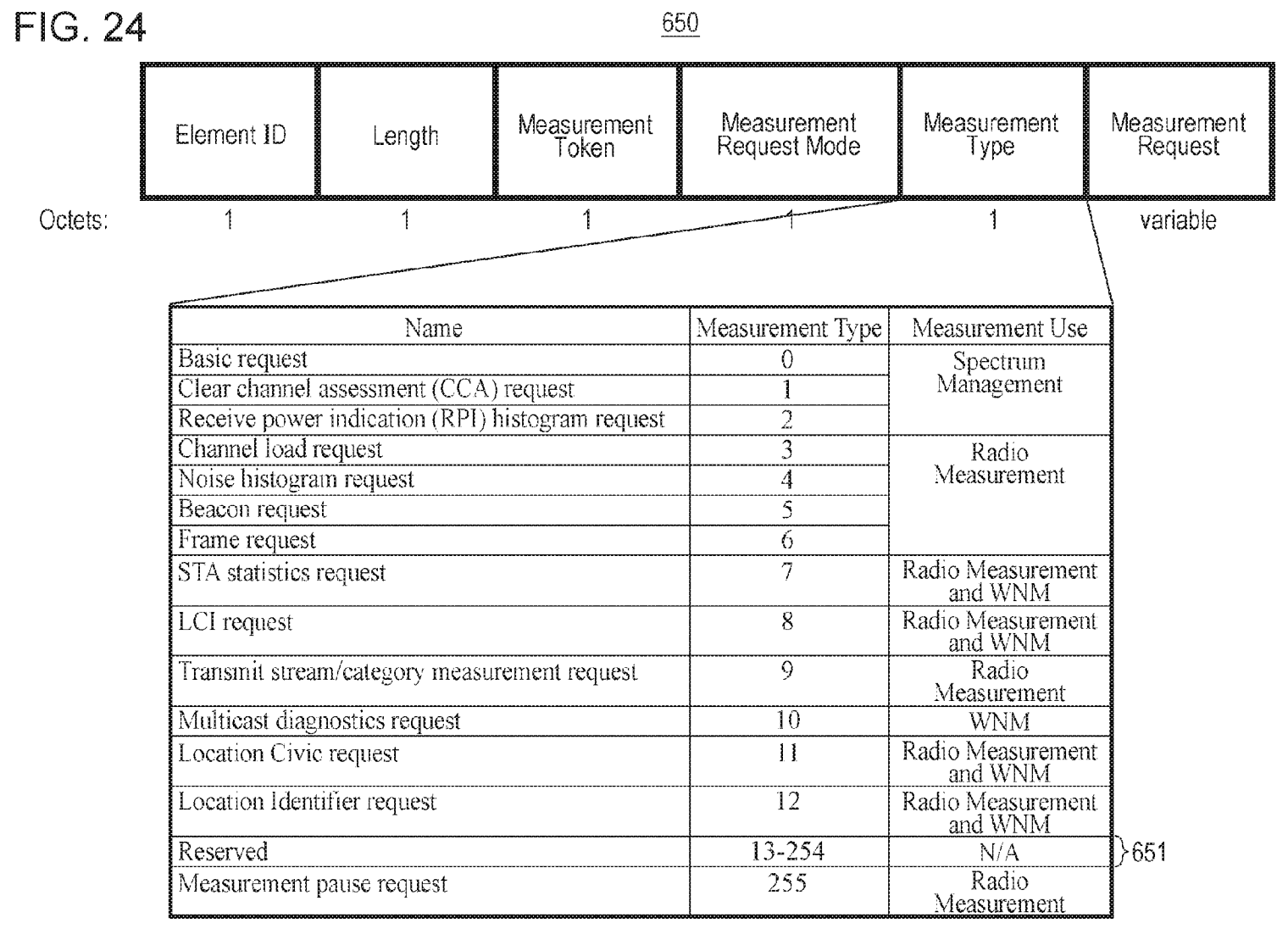

| | Element ID | Length | Measurement Token | Measurement Request Mode | Measurement Type | Measurement Request |
|---|---|---|---|---|---|---|
| Octets: | 1 | 1 | 1 | 1 | 1 | variable |

| Name | Measurement Type | Measurement Use |
|---|---|---|
| Basic request | 0 | Spectrum Management |
| Clear channel assessment (CCA) request | 1 | |
| Receive power indication (RPI) histogram request | 2 | |
| Channel load request | 3 | Radio Measurement |
| Noise histogram request | 4 | |
| Beacon request | 5 | |
| Frame request | 6 | |
| STA statistics request | 7 | Radio Measurement and WNM |
| LCI request | 8 | Radio Measurement and WNM |
| Transmit stream/category measurement request | 9 | Radio Measurement |
| Multicast diagnostics request | 10 | WNM |
| Location Civic request | 11 | Radio Measurement and WNM |
| Location Identifier request | 12 | Radio Measurement and WNM |
| Reserved | 13-254 | N/A |
| Measurement pause request | 255 | Radio Measurement |

| | Element ID | Length | Measurement Token | Measurement Report Mode | Measurement Type | Measurement Report |
|---|---|---|---|---|---|---|
| Octets: | 1 | 1 | 1 | 1 | 1 | variable |

| Name | Measurement Type | Measurement Use |
|---|---|---|
| Basic report | 0 | Spectrum Management |
| CCA report | 1 | |
| RPI histogram report | 2 | |
| Channel load report | 3 | Radio Measurement |
| Noise histogram report | 4 | |
| Beacon report | 5 | |
| Frame report | 6 | |
| STA statistics report | 7 | Radio Measurement and WNM |
| LCI report | 8 | Radio Measurement, Spectrum Management, and WNM |
| Transmit stream/category measurement report | 9 | Radio Measurement |
| Multicast diagnostics report | 10 | WNM |
| Location Civic report | 11 | Radio Measurement and WNM |
| Location Identifier report | 12 | Radio Measurement and WNM |
| Reserved | 13-255 | N/A |

| Order | Information |
|---|---|
| 1 | Category |
| 2 | DMG Action |
| 3 | Subject Address |
| 4 | DMG Capabilities 1 |
| ... | ... |
| N+3 | DMG Capabilities N (optional) |
| N+4 | Request information |
| N+5 | IE Provided 1 (optional) |
| ... | ... |
| 4+N+M | IE Provided M (optional) |
| Last | Vendor specific |

661

WIRELESS COMMUNICATION APPARATUS AND WIRELESS COMMUNICATION CONTROL METHOD

BACKGROUND

1. Technical Field

The present disclosure relates to a wireless communication apparatus and a wireless communication control method for performing wireless communication by switching beam patterns by using a plurality of antenna elements.

2. Description of the Related Art

With the advent of digital equipment with increased functionality, access points and terminal devices equipped with a wireless LAN (Local Area Network) are in widespread use. In recent years, the need for high-capacity and high-speed wireless communication has increased and, thus, high-speed wireless LANs at one gigabits/sec or higher have become popular.

Accordingly, a millimeter wave (60 GHz) high-speed wireless communication that performs directional communication using a plurality of antenna elements has attracted attention (refer to, for example, Japanese Unexamined Patent Application Publication No. 2014-112898).

In the technique described in PTL 1 (hereinafter referred to as "existing technique"), a direction in which the communication quality is excellent is determined for each of communication partners by using a procedure called beamforming training, and a communication area with high directivity (hereinafter, the area is referred to as a "beam") is formed toward the determined direction and, thereafter, wireless communication is performed. In this manner, the existing technique can increase the transmission level and the received level of wireless communication and, thus, the communication distance can be extended. In addition, the existing technique can decrease the width of the beam (a half-value angle). Accordingly, the interference in wireless communication systems can be reduced by using space division.

SUMMARY

When a mobile body, such as a portable information terminal, is included in the communication entities, an area with a high user density is likely to occur, and the relative positions between the wireless communication apparatuses are likely to change. Therefore, the existing technique is not suitable for improving the throughput of communication.

The reason is as follows. If the position of the communication partner becomes outside of the beam due to a change in the relative position and, thus, the communication is interrupted, the beamforming training needs to be performed again. In addition, to prevent such disconnection of communication, beamforming training needs to be performed frequently. Furthermore, frequent beamforming training increases the chance of interference between a training signal and other communication activities, which may also reduce the throughput of the other communication.

One non-limiting and exemplary embodiment provides a wireless communication apparatus and a wireless communication control method capable of improving the throughput of communication even when the communication entities include a mobile body.

In one general aspect, the techniques disclosed here feature a wireless communication apparatus including an antenna, which, in operation, changes a beam pattern by using a plurality of antenna elements, a communicator, which, in operation, performs wireless communication with a communication terminal by using the antenna, quality information acquisition circuitry, which, in operation, acquires quality information indicating a communication quality of the wireless communication, movement information acquisition circuitry, which, in operation, acquires movement information indicating movement of a relative position of the communication terminal with respect to the antenna, and beam control circuitry, which, in operation, controls the beam pattern to be changed by the antenna on the basis of the acquired quality information and movement information.

According to the present disclosure, the throughput of communication can be improved even when the communication entities include a mobile body.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10 illustrates an example of the details of beam pattern information according to the embodiment;

FIG. 11 illustrates an example of the details of the device type-movement information according to the embodiment;

FIG. 12 illustrates an example of the details of speed-movement information according to the embodiment;

FIG. 13 illustrates an example of the details of traffic-movement information according to the embodiment;

FIG. 14 illustrates an example of the details of battery-movement information according to the embodiment;

FIG. 20 illustrates an example of the details of a recommended behavior according to the embodiment;

FIG. 23 illustrates a fourth example of the frame format according to the embodiment;

FIG. 24 illustrates a fifth example of the frame format according to the embodiment;

FIG. 25 illustrates a sixth example of the frame format according to the embodiment; and FIG. 26 illustrates a seventh example of the frame format according to the embodiment.

DETAILED DESCRIPTION

An embodiment of the present disclosure is described in detail below with reference to the accompanying drawings.

Outline of Beamforming Training

The outline of beamforming training performed by a wireless communication apparatus according to the present embodiment is described first.

Figure 1:
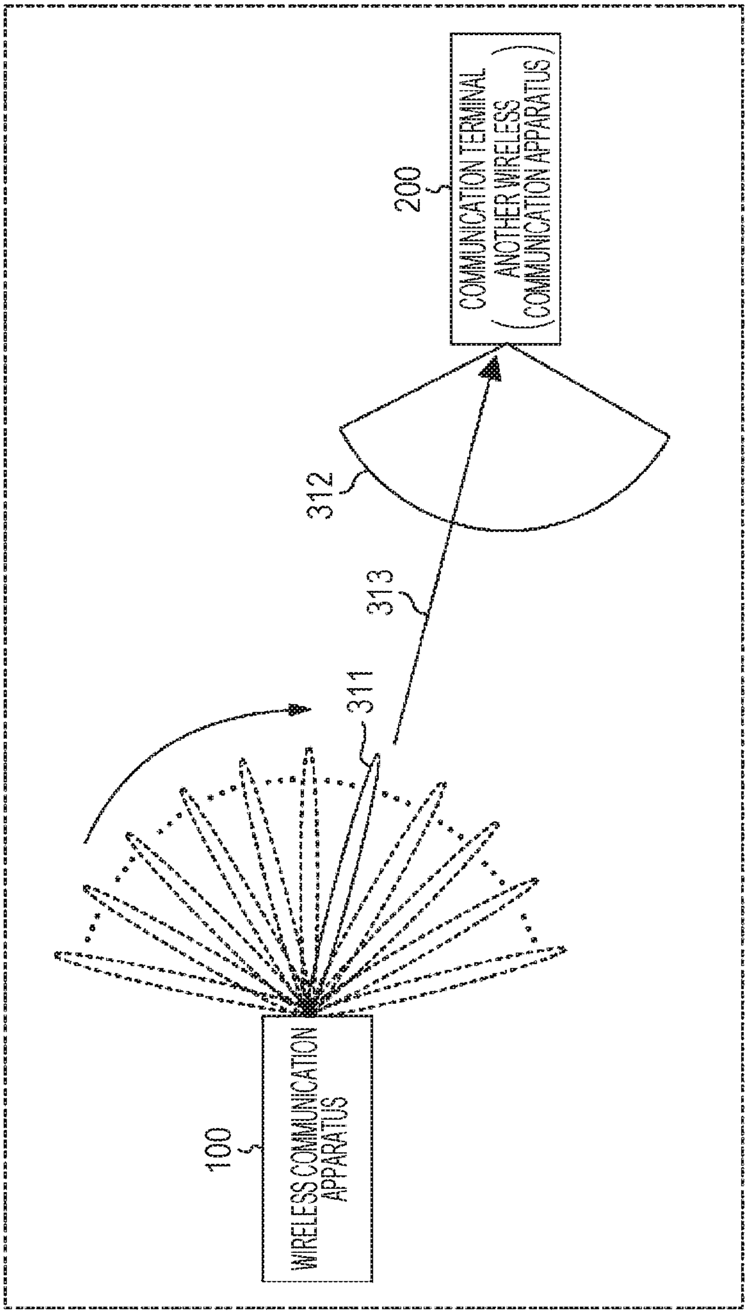
FIG. 1 illustrates beamforming training according to an embodiment of the present disclosure.
Figure 2:
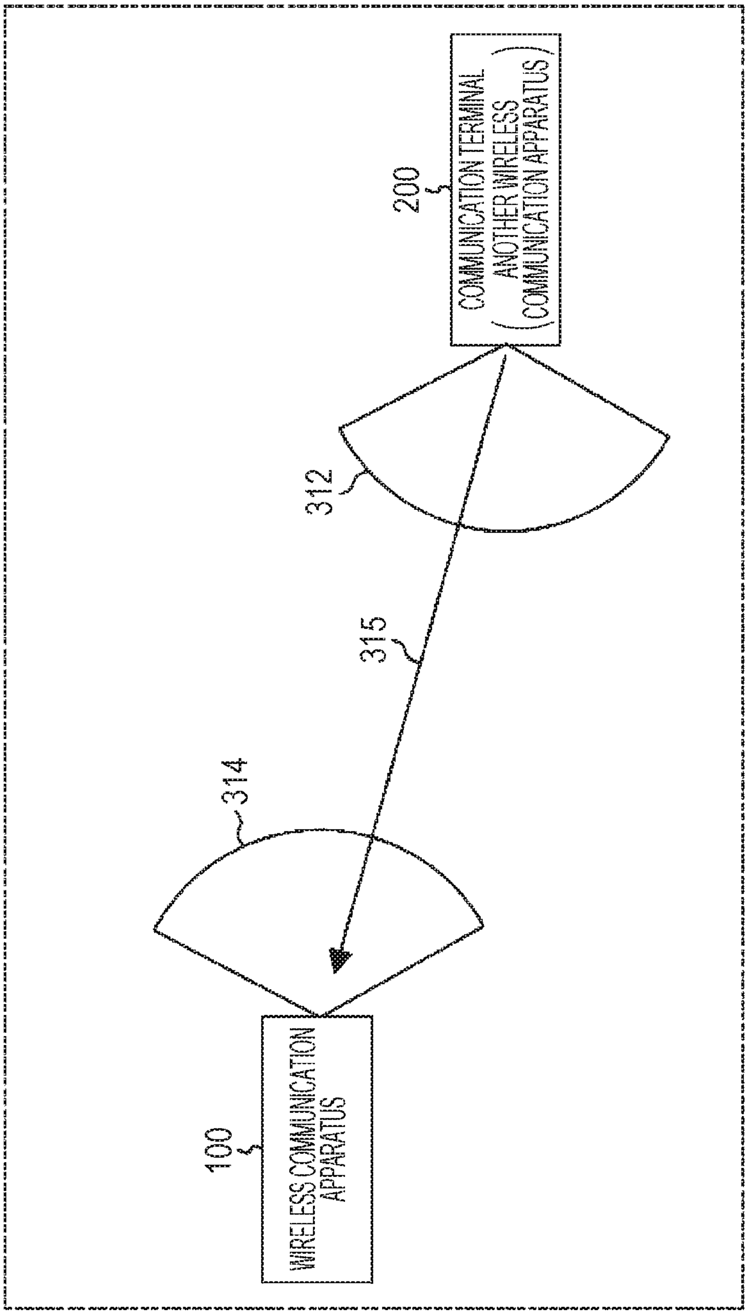
FIG. 2 illustrates beamforming training according to the embodiment.

FIG. 1 and FIG. 2 are diagrams illustrating beamforming training.

As illustrated in FIG. 1 and FIG. 2, the following description is given with reference to the case where a wireless communication apparatus 100 and a communication terminal 200 according to the present embodiment are present, and at least one of the wireless communication apparatus 100 and the communication terminal 200 moves so as to be closer to the other.

Note that the communication terminal 200 may have the same configuration as that of the wireless communication apparatus 100 (described below). That is, the communication terminal 200 can be regarded as "another wireless communication apparatus" according to the present embodiment. The present embodiment is described below with reference to the case where the communication terminal 200 and the wireless communication apparatus 100 have the same configuration.

The wireless communication apparatus 100 has a plurality of antenna elements (not illustrated) arranged therein. The wireless communication apparatus 100 performs so-called beamforming in which the beam direction (a communication area) is electronically changed by selecting the antenna elements to be used and controlling the phases of the transmission and reception radio waves in the respective antenna elements.

In beamforming, decreasing the beam half-value angle increases the beam length and is accomplished by increasing the number of antenna elements used. In contrast, increasing the beam half-value angle increases the beamwidth and is accomplished by decreasing the number of antenna elements used. As used herein, the term "beam half-value angle" refers to an angle of the range in which the electric field intensity or the receive sensitivity is higher than or equal to 50% of the value in the direction in which the electric field intensity or receive sensitivity is maximized.

The wireless communication apparatus 100 performs beamforming training to determine a beam pattern to be used for communication with the communication terminal 200 when triggered by, for example, reception of a connection request transmitted from the communication terminal 200. Note that the beam pattern indicates the size and shape of the communication area and is defined, for example, by the beam half-value angle. The beam pattern becomes thinner in the range direction with decreasing beam half-value angle.

More specifically, as illustrated in FIG. 1, first, the wireless communication apparatus 100 switches between narrow-directivity beams 311 each having a small beam half-value angle in a plurality of directions and sequentially transmits a training signal in each beam direction. In contrast, the communication terminal 200 forms a wide-directivity beam 312 having a large beam half-value angle and waits for reception of the training signal. The training signal transmitted in each of the directions includes identification information of the beam direction. The communication terminal 200 determines which one of training signals 313 has the best reception quality.

After completing the transmission of the training signal in a plurality of directions, the wireless communication apparatus 100 forms a wide-directivity beam 314 having a large beam half-value angle, as illustrated in FIG. 2, and waits for reception from the communication terminal 200. The communication terminal 200 sends back, to the wireless communication apparatus 100, the identification information of the beam direction included in the training signal 313 determined to have the best reception quality as the information 315 (hereinafter referred to as "beam direction information") indicating the optimum beam direction for the communication terminal 200.

When the beam direction information 315 indicating the optimum beam direction for communication with the communication terminal 200 is acquired in this manner, the wireless communication apparatus 100 forms a beam pattern that sharply extends in the beam direction and starts data communication with the communication terminal 200.

Figure 3:
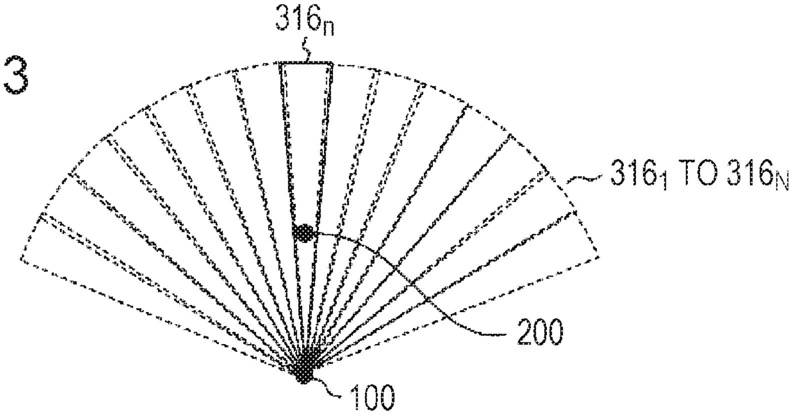
FIG. 3 illustrates an example of the relationship between a beam pattern and the position of a communication terminal according to the embodiment.

FIG. 3 is a diagram illustrating an example of the relationship between a plurality of beam patterns that the wireless communication apparatus 100 can form and the position of the communication terminal 200.

As illustrated in FIG. 3, the wireless communication apparatus 100 can form first to N-th beam patterns $\mathbf{316}_1$ to $\mathbf{316}_N$ (N is an integer equal to 2 or greater) in a time division manner. For example, assume that the communication terminal 200 is located inside the beam of the n-th beam pattern $\mathbf{316}_n$. In this case, the n-th beam pattern $\mathbf{316}_n$ is determined as a beam pattern that is most suitable for communication with the communication terminal 200. Thereafter, the wireless communication apparatus 100 forms a beam of the n-th beam pattern $\mathbf{316}_n$ and starts data communication with the communication terminal 200.

Switching of Beam Pattern

At this time, if at least one of the wireless communication apparatus 100 and the communication terminal 200 moves, the position of the communication terminal 200 relative to the wireless communication apparatus 100 (hereinafter referred to as "relative position") may be outside the beam of the n-th beam pattern $\mathbf{316}_n$.

Therefore, the wireless communication apparatus 100 according to the present disclosure acquires the quality information indicating the communication quality of the wireless communication with the communication terminal 200 and movement information indicating the movement of the communication terminal 200 relative to the wireless communication apparatus 100 (hereinafter referred to as "relative movement"). Thereafter, the wireless communication apparatus 100 switches the beam pattern 316 used for communication with the communication terminal 200 on the basis of the acquired quality information and movement information so that the probability of the position of the communication terminal 200 being outside the beam is low.

FIGS. 4A, 4B, 5A, 5B, 6A, and 6B are diagrams illustrating an example of how beam patterns are switched for each of the states of relative movement.

Figure 4A:
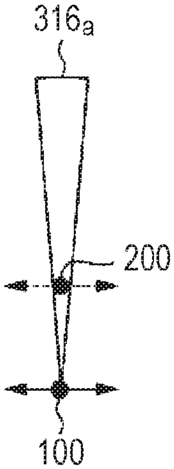
FIG. 4A illustrates a first example of a beam pattern switching method according to the embodiment.
Figure 4B:
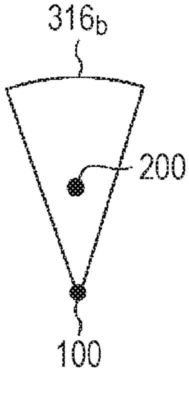
FIG. 4B illustrates the first example of a beam pattern switching method according to the embodiment.

As illustrated in FIG. 4A, when a beam of a beam pattern $\mathbf{316}_a$ having a narrow beam half-value angle is formed, one of the wireless communication apparatus 100 and the communication terminal 200 is about to perform a relative movement in the angular direction. In this case, the wireless communication apparatus 100 detects such a relative movement and switches the beam pattern $\mathbf{316}_a$ to a beam pattern $\mathbf{316}_b$ having a wider beam half-value angle, as illustrated in FIG. 4B.

Figure 5A:
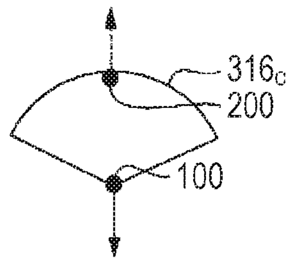
FIG. 5A illustrates a second example of a beam pattern switching method according to the embodiment.
Figure 5B:
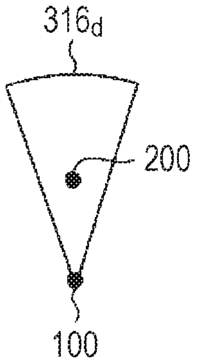
FIG. 5B illustrates the second example of a beam pattern switching method according to the embodiment.

As illustrated in FIG. 5A, when a beam of a beam pattern $\mathbf{316}_c$ having a wide beam half-value angle (the beam length is short) is formed, one of the wireless communication apparatus 100 and the communication terminal 200 is about to perform a relative movement in the range direction. In this case, the wireless communication apparatus 100 detects such a relative movement and switches the beam pattern $\mathbf{316}_c$ to a beam pattern $\mathbf{316}_d$ having a narrower beam half-value angle (the beam length is longer), as illustrated in FIG. 5B.

Figure 6A:
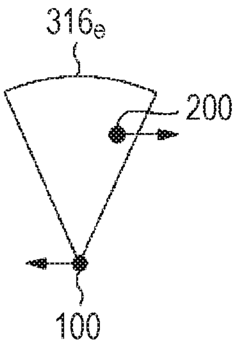
FIG. 6A illustrates a third example of a beam pattern switching method according to the embodiment.
Figure 6B:
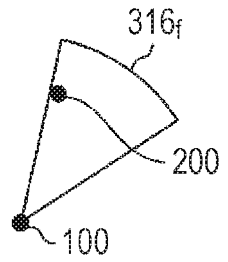
FIG. 6B illustrates the third example of a beam pattern switching method according to the embodiment.

As illustrated in FIG. 6A, when the communication terminal 200 is positioned at the end portion of a beam pattern $\mathbf{316}_e$ in the angular direction, where the beam pattern 316*e* extends in a certain direction, one of the wireless communication apparatus 100 and the communication terminal 200 is about to perform relative movement in a direction in which the communication terminal 200 moves closer to the end portion. In this case, the wireless communication apparatus 100 detects such relative movement and switches the beam pattern $\mathbf{316}_e$ to an adjacent beam pattern $\mathbf{316}_f$ that overlaps the beam pattern $\mathbf{316}_e$ in the above-mentioned end portion, as illustrated in FIG. 6B.

By switching the beam pattern 316 in the above-described manner, the wireless communication apparatus 100 according to the present disclosure can maintain wireless communication with the communication terminal 200 while reducing the frequency of beamforming training.

Configuration of Apparatus

The configuration of the wireless communication apparatus 100 is described below.

Figure 7:
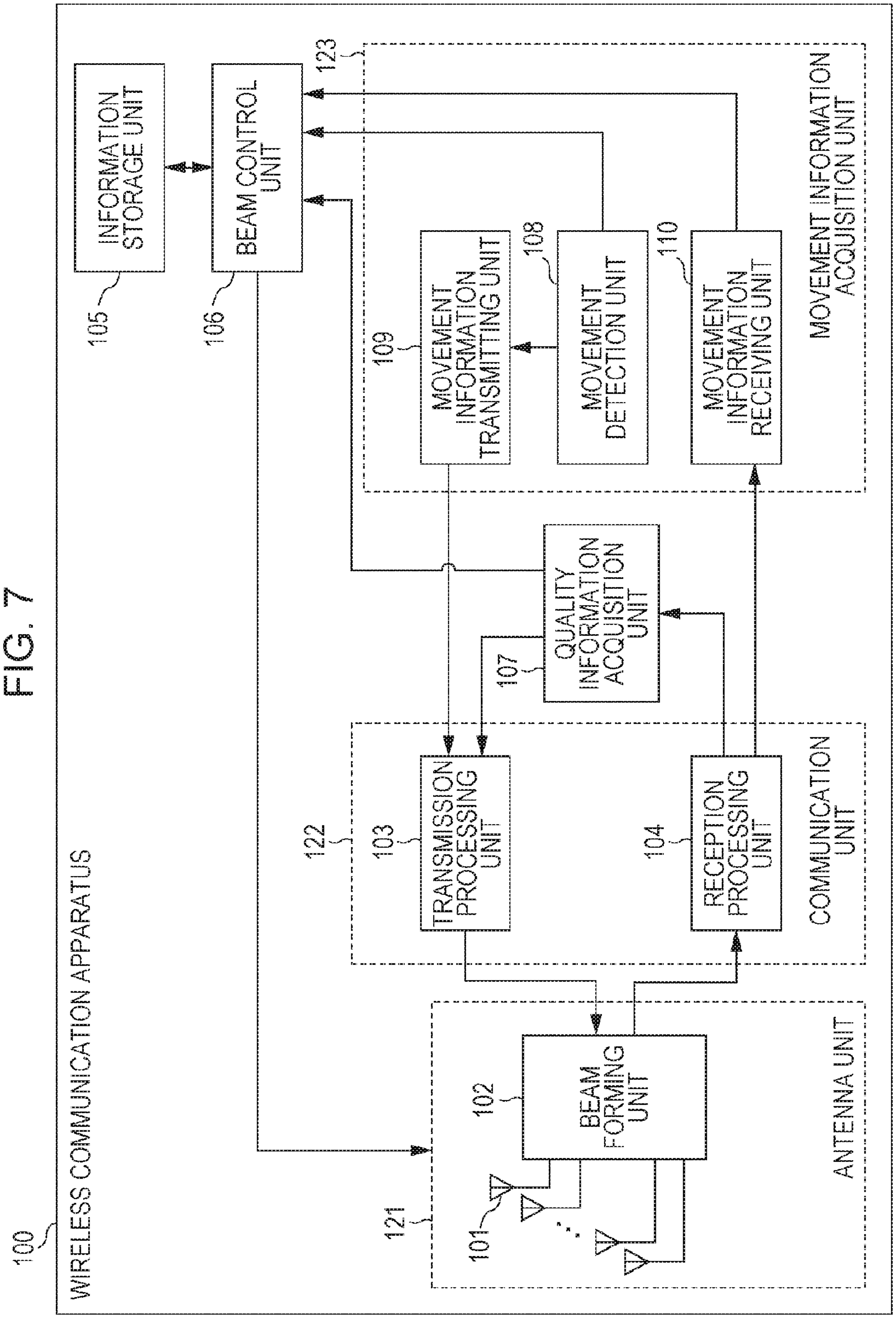
FIG. 7 illustrates an example of the configuration of a wireless communication apparatus according to the present embodiment.

FIG. 7 is a block diagram illustrating an example of the configuration of the wireless communication apparatus 100.

As illustrated in FIG. 7, the wireless communication apparatus 100 includes a plurality of antenna elements 101, a beam forming unit 102, a transmission processing unit 103, a reception processing unit 104, an information storage unit 105, a beam control unit 106, a quality information acquisition unit 107, a movement detection unit 108, a movement information transmitting unit 109, and a movement information receiving unit 110.

The plurality of antenna elements 101 are array antennas arranged in a predetermined arrangement.

The beam forming unit 102 excites all or some of the plurality of antenna elements 101 and controls the amplitude and the phase of an excitation current under the control of the beam control unit 106 (described below). Thus, the beam forming unit 102 forms a beam used to transmit and receive radio signals.

A group of the plurality of antenna elements 101 and the beam forming unit 102 is referred to as an "antenna unit 121" as needed. That is, the antenna unit 121 is a device unit which can form a plurality of beam patterns by switching using a plurality of antenna elements 101.

The transmission processing unit 103 modulates a variety of types of control signals including the above-described training signals and a variety of information to be transmitted to the communication terminal 200 into a millimeter wave signal and transmits the modulated signal via the antenna unit 121.

The reception processing unit 104 demodulates the millimeter wave signal received by the antenna unit 121 into the information included in the millimeter wave signal. Such information includes a variety of control signals including the above-described training signal and information sent from the communication terminal 200.

Note that a group of the transmission processing unit 103 and the reception processing unit 104 is referred to as a "communication unit 122" as appropriate. That is, the communication unit 122 is a device unit that performs wireless communication with the communication terminal 200 by using the antenna unit 121.

The information storage unit 105 stores quality determination information and movement determination information in advance.

The quality determination information is information describing a criterion used to determine whether a beam used for communication with the communication terminal 200 can be switched from the viewpoint of communication quality in association with quality information. As used herein, the term "quality information" refers to information indicating the communication quality of wireless communication with the communication terminal 200. The quality information is acquired by the quality information acquisition unit 107 (described below). The quality determination information is described in more detail below.

The movement determination information is information describing a criterion used to determine whether the probability of the position of the communication terminal 200 being outside the beam is high in association with movement information. As used herein, the term "movement information" is information indicating a state of relative movement of the communication terminal 200 with respect to the antenna unit 121 (the plurality of antennas 101). The movement determination information is described in more detail below.

The beam control unit 106 controls the beam formed by the antenna unit 121. More specifically, upon performing beamforming training, the beam control unit 106 causes the antenna unit 121 to sequentially form the narrow-directivity beams 311 in a plurality of directions in response to an instruction from quality information acquisition unit 107 and, thus, form the wide-directivity beam 314 (refer to FIGS. 1 and 2). After completing the beamforming training, the beam control unit 106 forms the beam pattern 316$_n$ having a narrow beam half-value angle in a direction that is determined as the best direction (refer to FIG. 3).

Furthermore, the beam control unit 106 determines whether the beam used for communication with the communication terminal 200 can be switched from the viewpoint of communication quality on the basis of the quality determination information stored in the information storage unit 105 and the quality information acquired by the quality information acquisition unit 107. In addition, the beam control unit 106 determines whether the probability of the position of the communication terminal 200 being outside the beam is high on the basis of the movement determination information stored in the information storage unit 105 and the movement information acquired by the movement information acquisition unit 123 (described below). Thereafter, if the beam can be switched and the probability of the relative position being outside the beam is high, the beam control unit 106 switches the beam pattern of the antenna unit 121 so that the probability is low (refer to FIGS. 4A to 6B).

The quality information acquisition unit 107 acquires the quality information. The details of the quality information and the acquisition method vary depending on the details of the quality determination information stored in the information storage unit 105. According to the present embodiment, in the beamforming training, the quality information acquisition unit 107 controls the beam control unit 106 and the communication unit 122 to acquire, as the quality information, the received signal strength of the signal received from the communication terminal 200.

The quality information is a concept that involves at least one of the reception quality of a signal transmitted from the communication terminal 200 in the wireless communication apparatus 100 and the reception quality of a signal transmitted from the wireless communication apparatus 100 in the communication terminal 200. The quality information acquisition unit 107 may transmit, to the communication terminal 200 via the communication unit 122, the quality information indicating the reception quality in the wireless communication apparatus 100 or may receive, from the communication terminal 200 via the communication unit 122, the quality information indicating the reception quality in the communication terminal 200.

The movement detection unit 108 detects the movement state of the wireless communication apparatus 100 and transmits, to the beam control unit 106, information indicating the detected movement state of the wireless communication apparatus 100 (hereinafter referred to as "first movement information") as part of the above-described movement information. In addition, the movement detection unit 108 outputs the detected first movement information to the movement information transmitting unit 109.

The details of the movement information and the method for acquiring the content of the movement information vary depending on the details of the movement determination information stored in the information storage unit 105. According to the present embodiment, the movement detection unit 108 detects, as the first movement information, information indicating a direction in which the wireless communication apparatus 100 is moving and the moving speed (a movement vector) by using a widely used movement detection sensor, such as a GPS (Global Positioning System) sensor or a gyro sensor.

The movement information transmitting unit 109 transmits the first movement information output from the movement detection unit 108 to the communication terminal 200 by using the communication unit 122. The movement information transmitting unit 109 may perform the transmission during beamforming training or at another time point.

When information indicating the state of movement of the communication terminal 200 (hereinafter referred to as "second movement information") is transmitted from the communication terminal 200, the movement information receiving unit 110 receives the second movement information by using the communication unit 122. The movement information receiving unit 110 may perform the reception during beamforming training or at another time point. Thereafter, the movement information receiving unit 110 outputs the received second movement information to the beam control unit 106 as part of the above-described movement information.

That is, the movement information used in the present embodiment includes the first movement information indicating the movement state of the wireless communication apparatus 100 and the second movement information indicating the movement state of the communication terminal 200.

Note that a group of the movement detection unit 108, the movement information transmitting unit 109, and the movement information receiving unit 110 is referred to as a "movement information acquisition unit 123" as needed. That is, the communication unit 122 is a device unit that acquires movement information indicating the state of a relative movement of the communication terminal 200 with respect to the antenna unit 121.

To transmit or receive each of the first movement information and the second movement information, the information is set forth in a predetermined area of a frame transmitted and received between the wireless communication apparatus 100 and the communication terminal 200. The format of the frame in which the first movement information or the second movement information is set forth is described in detail below.

In addition, as described above, according to the present embodiment, the communication terminal 200 has the same configuration as the wireless communication apparatus 100. Therefore, the first movement information transmitted from the wireless communication apparatus 100 is the second movement information for the communication terminal 200, and the first movement information transmitted from the communication terminal 200 is the second movement information for the wireless communication apparatus 100. Accordingly, the first movement information and the second movement information are collectively referred to as "movement information" as appropriate.

Although not illustrated, the wireless communication apparatus 100 includes a CPU (Central Processing Unit), a storage medium, such as a ROM (Read Only Memory) storing a control program, a work memory, such as a RAM (Random Access Memory), and a communication circuit. In this case, the functions of the above-described units are provided by the CPU executing the control program.

The wireless communication apparatus 100 having such a configuration can switch the beam pattern used for communication with the communication terminal 200 based on the quality information and the movement information so that the probability of the position of the communication terminal 200 being outside is low.

Quality Determination Information

The quality determination information is described in detail below.

The quality determination information includes at least one of MCS-receive sensitivity information, number of used antennas-antenna gain information, MCS-receive sensitivity information, and beam pattern information, for example.

Figure 8:
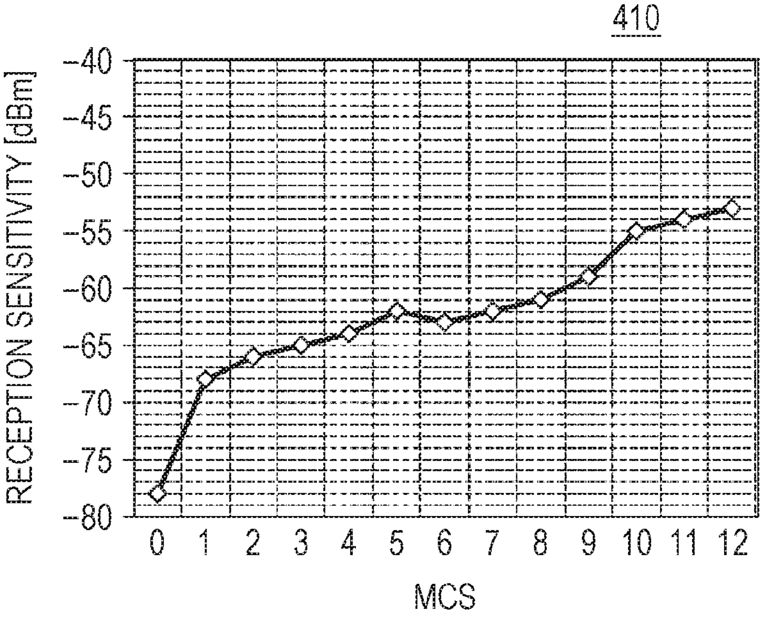
FIG. 8 illustrates an example of the details of MCS-receive sensitivity information according to the embodiment.

FIG. 8 is a diagram illustrating an example of the details of MCS-receive sensitivity information. In FIG. 8, the abscissa represents MCS (Modulation and Coding Scheme), and the ordinate represents the receive sensitivity [dBm] at the antenna output end of the antenna unit 121. The MCS is an index indicating a combination of various conditions, such as a modulation method and a coding rate applied to radio signals. Note that the MCS is determined in accordance with, for example, the communication speed required for the application software which uses the data.

As illustrated in FIG. 8, the MCS-receive sensitivity information 410 describes the receive sensitivity (the minimum receivable received power) at the antenna output terminal of the antenna unit 121 for each MCS.

Figure 9:
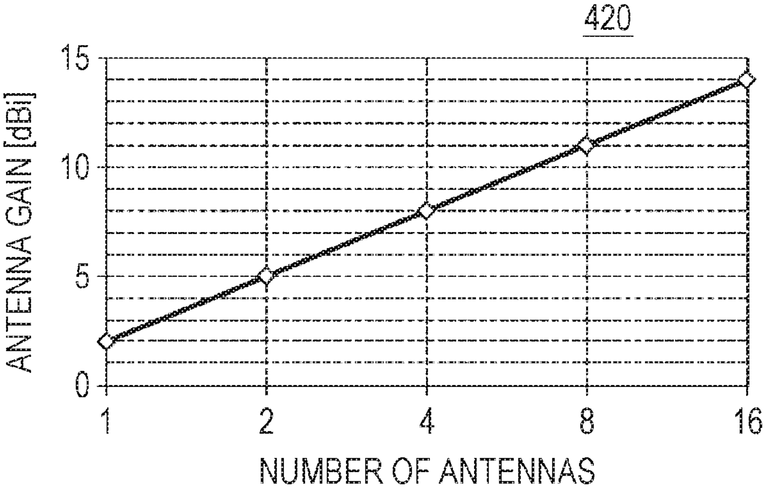
FIG. 9 illustrates an example of the details of the number of used antennas-antenna gain information according to the embodiment.

FIG. 9 is a diagram illustrating an example of the details of the number of used antennas-antenna gain information. In FIG. 9, the abscissa represents the number of antenna elements 101 used by the antenna unit 121 (hereinafter referred to as the "number of used antennas"), and the ordinate represents the antenna gain [dBi] of the antenna unit 121.

As illustrated in FIG. 9, the number of used antennas-antenna gain information 420 describes the antenna gain obtained by the antenna unit 121 for each of the numbers of used antennas (that is, for each of the beam patterns). That is, the number of used antennas-antenna gain information 420 indicates how much the antenna gain changes when the beam pattern is changed.

FIG. 10 is a diagram illustrating an example of the details of beam pattern information. The beam pattern information is prepared in advance for each of the beam patterns (the beam patterns before switching). In FIG. 10, the beam pattern information corresponding to a beam pattern having the maximum number of used antennas 16 is illustrated as an example.

As illustrated in FIG. 10, the beam pattern information 430 includes the beam half-value angle [deg] 432, the difference [dB] 433 between the received power and the receive sensitivity when the maximum number of the receive antennas 16 are used, and the communication distance [m] 434 for each of the numbers of antennas 431 (i.e., for each of the beam patterns).

The number of used antennas 431 and the beam half-value angle 432 are the number of used antennas and the beam half-value angle of the beam pattern after switching, respectively. The difference 433 between the received power and the receive sensitivity at the time of communication is an allowable range of the difference between the received power of the transmission signal from the communication terminal 200 in the wireless communication apparatus 100 and the receive sensitivity of the adopted MCS before switching. The communication distance is an allowable range of the distance between the wireless communication apparatus 100 and the communication terminal 200.

For example, for the beam pattern having the number of used antennas 431 of "8" and a beam half-value angle 432 of "15", the following information is set forth. That is, the difference 433 between the received power and the receiving sensitivity at the time of communication is "6 or more and less than 9", and the communication distance is "2.1 or more and less than 3". The information indicates that switching to this beam pattern is to be made under the condition that the difference between the received power from the communication terminal 200 and the receive sensitivity (refer to FIG. 8) of the adopted MCS is 6 dB or more and less than 9 dB, that is, the distance from the wireless communication apparatus 100 to the communication terminal 200 is 2.1 m or more and less than 3 m.

As illustrated in FIG. 9, when the number of antennas used decreases from 16 to 8, the antenna gain decreases by 3 dB. Therefore, in the case where the number of antennas used is 16, if the received power during communication is more than the receive sensitivity by 6 dB or more, a margin of 3 dB or more can be ensured even when the beam pattern is switched to a beam pattern using 8 antennas.

In this way, as illustrated in FIG. 10, the content of the beam pattern information 430 indicates which beam pattern enables switching thereto so that a margin of 3 dB or more is ensured in the beam pattern after switching.

In addition, for example, for the beam pattern having the number of antennas 431 "4" and the beam half-value angle 432 "30", the difference between received power and receive sensitivity during communication 433 of "greater than or equal to 9 and less than 12" and the difference 433 of "greater than or equal to 1.5 and less than 2.1" are set forth. The information indicates that switching to this beam pattern is to be made under the condition that the difference between the received power received from the communication terminal 200 and the receive sensitivity (refer to FIG. 8) of the adopted MCS is greater than or equal to 9 dB and less than 12 dB, that is, the distance from the wireless communication apparatus 100 to the communication terminal 200 is greater than or equal to 1.5 m and less than 2.1 m.

When the number of antennas used is 16, the half-value angle of the beam is 7.5 deg. Accordingly, the beamwidth that enables communication when the distance is 2 m is about 24 cm. For example, assume that a walking speed of a person is 4 km/h and a user carrying one of the wireless communication apparatus 100 and the communication terminal 200 is walking. In this case, for example, the relative position of the communication terminal 200 can move about 24 cm in 200 ms (milliseconds) in the angular direction. Therefore, the beamforming training needs to be performed at a cycle shorter than 200 ms, for example.

In contrast, when the number of antennas used is 4, the half-value angle of the beam is 30 deg. Accordingly, the beamwidth that enables communication when the distance is 2 m is about 1 m. Therefore, the beamforming training execution interval can be, for example, about 1 s (second). That is, by switching the current beam pattern to a beam pattern having a larger beam half-value angle, the wireless communication apparatus 100 can mitigate the beamforming training cycle and, thus, prevent disconnection of communication.

Movement Determination Information

The movement determination information is described in detail below.

The movement determination information includes at least one of device type-movement information, speed-movement information, traffic-movement information, and battery-movement information, for example.

FIG. 11 is a diagram illustrating an example of the details of the device type-movement information.

As illustrated in FIG. 11, the device type-movement information 510 describes the presence of movement 512 for each of device types 511. The device type 511 indicates the device type of the wireless communication apparatus 100 or the communication terminal 200. The presence of movement 512 indicates whether the position of the communication terminal 200 is highly likely to move out of the beam. For example, the device type-movement information 510 sets forth that the presence/absence of movement 512 is "YES" (movement is highly likely) in association with each of the device types 511 "notebook PC" and "smartphone".

FIG. 12 is a diagram illustrating an example of the details of the speed-movement information.

As illustrated in FIG. 12, the speed-movement information 520 describes the presence of movement 522 at each of speeds 521. The speed 521 indicates the relative speed of the communication terminal 200 with respect to the wireless communication apparatus 100. The presence of movement 522 indicates whether the position of the communication terminal 200 is highly likely to move out of the beam. For example, the speed-movement information 520 sets forth that the presence of movement 522 is "YES" (movement is highly likely) in association with a speed 521 of "0 km/h<" (the absolute value of the relative speed exceeds 0 km/h).

FIG. 13 is a diagram illustrating an example of the details of the traffic-movement information.

As illustrated in FIG. 13, the traffic-movement information 530 describes the presence of movement 532 for each of traffic types 531. The traffic type 531 indicates the type of communication traffic between the wireless communication apparatus 100 and the communication terminal 200. The presence of movement 532 indicates whether the position of the communication terminal 200 is likely to move out of the beam. For example, the traffic-movement information 530 sets forth that the presence of movement 532 is "YES" (movement is highly likely) in association with each of the traffic types 531 "Video" and "Voice".

FIG. 14 is a diagram illustrating an example of the details of the battery-movement information.

As illustrated in FIG. 14, the battery-movement information 540 describes the presence of movement 542 for each of battery-powered operations 541. The battery-powered operation 541 indicates whether the wireless communication apparatus 100 or the communication terminal 200 is operating with battery power. The presence of movement 542 indicates whether the position of the communication terminal 200 is highly likely to move out of the beam. For example, the battery-movement information 540 sets forth that the presence of movement 542 is "YES" (movement is highly likely) in association with a battery-powered operation 541 of "YES" (operating with battery power).

Frame Format

The frame format used to send and receive the movement information is described in detail below.

As an example of the frame format used to transmit and receive the movement information, any one of the following frame formats can be employed: DMG STA Capability Information field format, DMG PCP/AP Capability Information field format, and TSPEC (Traffic SPECification) element format.

Figure 15:
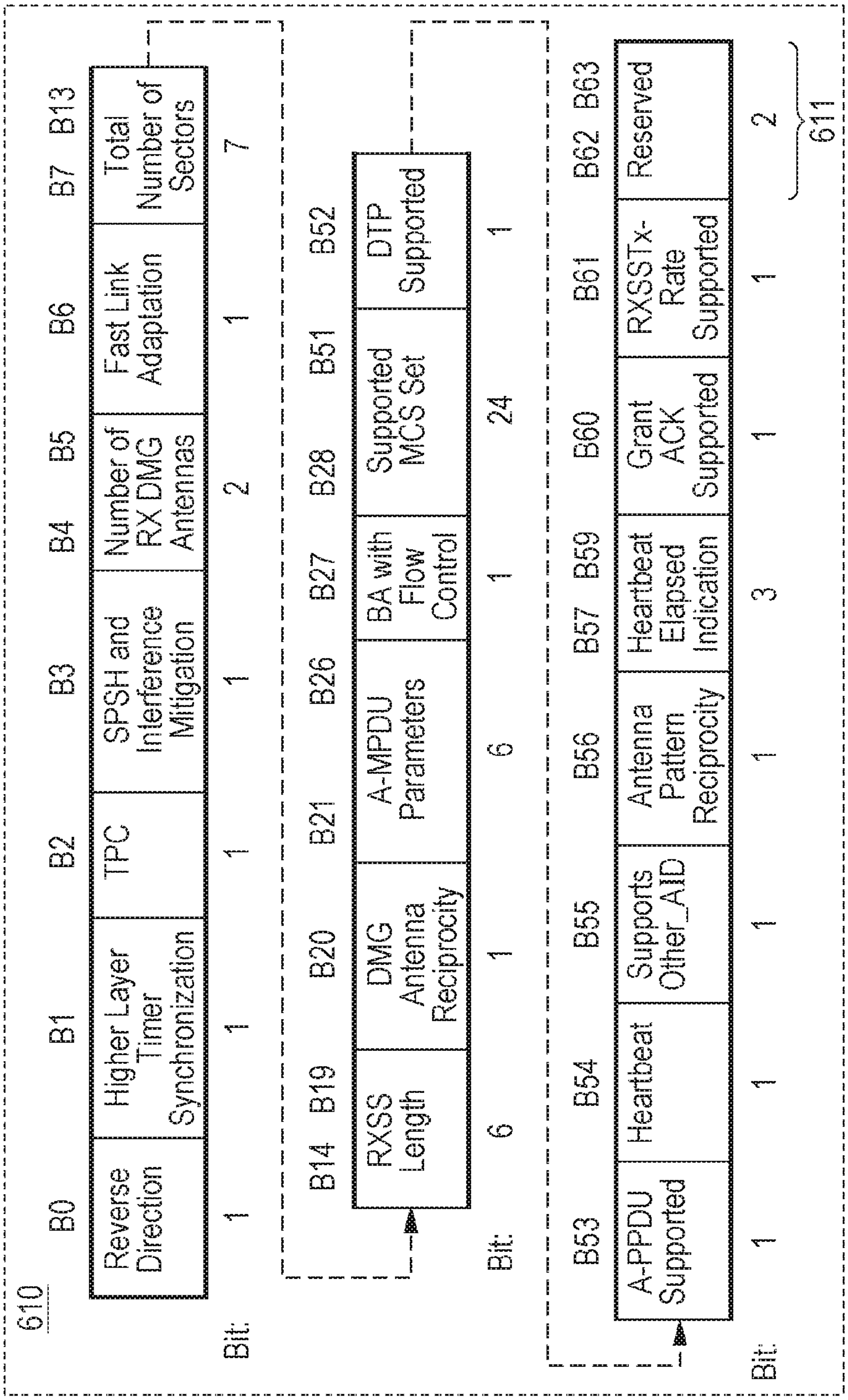
FIG. 15 illustrates a first example of a frame format according to the embodiment.

FIG. 15 illustrates an example of the description field of the movement information in the case where the DMG STA capability information field format of the IEEE 802.11ad (Part 11: Wireless LAN Medium Access Control (MAC) and Physical Layer (PHY) Specifications) is employed.

For example, as illustrated in FIG. 15, the wireless communication apparatus 100 writes, as the movement information, a mobility category into a 2-bit Reserved 611 of the DMG STA Capability Information field format 610.

The mobility category is defined in advance in accordance with the movement information used by the wireless communication apparatus 100 to determine the presence of movement. For example, in the case of the mobility category indicating the device type, the mobility category is defined as "0: desktop PC, 1: notebook PC, 2: smartphone, 3: reserved". Alternatively, for example, in the case of the mobility category indicating the moving speed, the mobility category is defined as "0: 0 km/h, 1: 0 km/h<speed<4 km/h, 2: 4 km/h speed, 3: reserved" is defined in advance.

Figure 16:
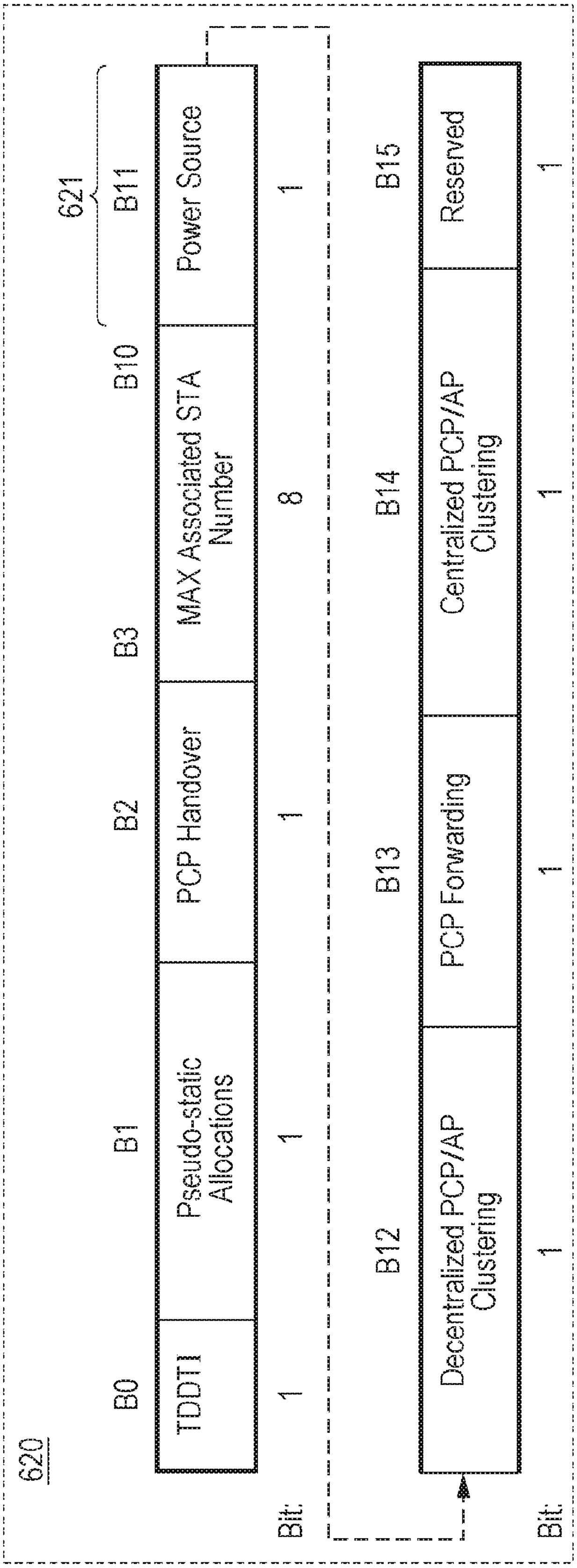
FIG. 16 illustrates a second example of the frame format according to the embodiment.

FIG. 16 is a diagram illustrating the description field of the movement information in the case where the DMG PCP/AP capability information field format of the IEEE 802.11ad (Part 11: Wireless LAN Medium Access Control (MAC) and Physical Layer (PHY) Specifications) is employed.

For example, as illustrated in FIG. 16, the wireless communication apparatus 100 writes, as the movement information, the mobility category into the Power Source field 621 of the DMG PCP/AP Capability Information field format 620. For example, in the case of the mobility category indicating the battery-powered operation, the mobile category "0: battery-powered operation, 1: others" is defined in advance.

Figure 17:
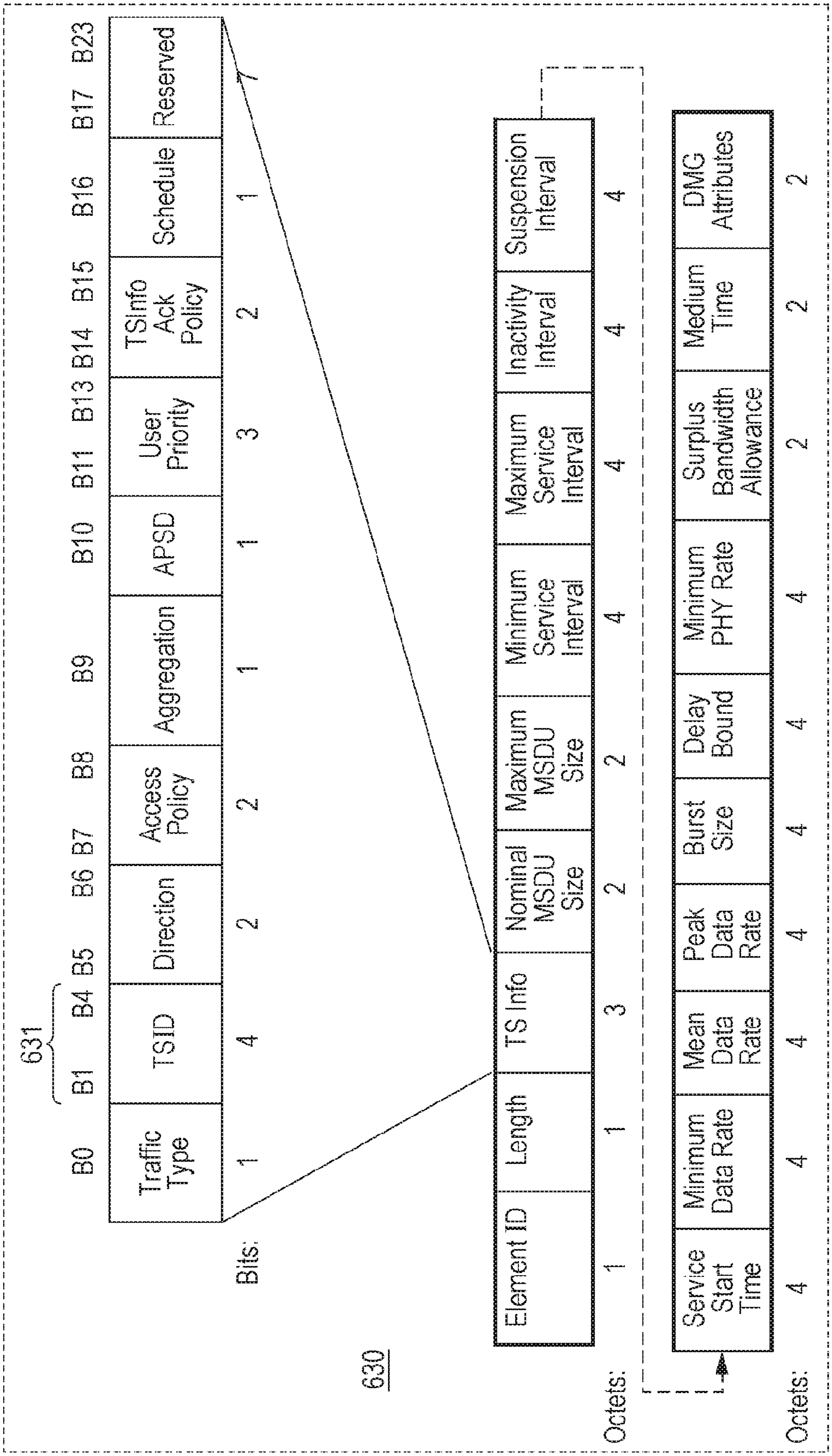
FIG. 17 illustrates a third example of the frame format according to the embodiment.

FIG. 17 is a diagram illustrating an example of the description field of the movement information in the case where the TSPEC element format of IEEE 802.11 (Part 11: Wireless LAN Medium Access Control (MAC) and Physical Layer (PHY) Specifications) is employed as the frame format.

For example, as illustrated in FIG. 17, the wireless communication apparatus 100 writes, as the movement information, the mobility category into, for example, the TSID field 631 of the TS Info field of the TSPEC element format 630. For example, in the case of the mobility category indicating the type of traffic, the mobility category "0: Best Effort, 1: Video, 2: Voice" is defined in advance.

Note that the wireless communication apparatus 100 may use a combination of these frame formats to exchange more mobility categories with the communication terminal 200. In this manner, the wireless communication apparatus 100 can transmit and receive more movement information to and from the communication terminal 200. As a result, determination of the probability of the relative position of the communication terminal 200 being outside the beam can be made with higher accuracy.

Operation Performed by Apparatus

The operation performed by the wireless communication apparatus 100 is described below.

Figure 18:
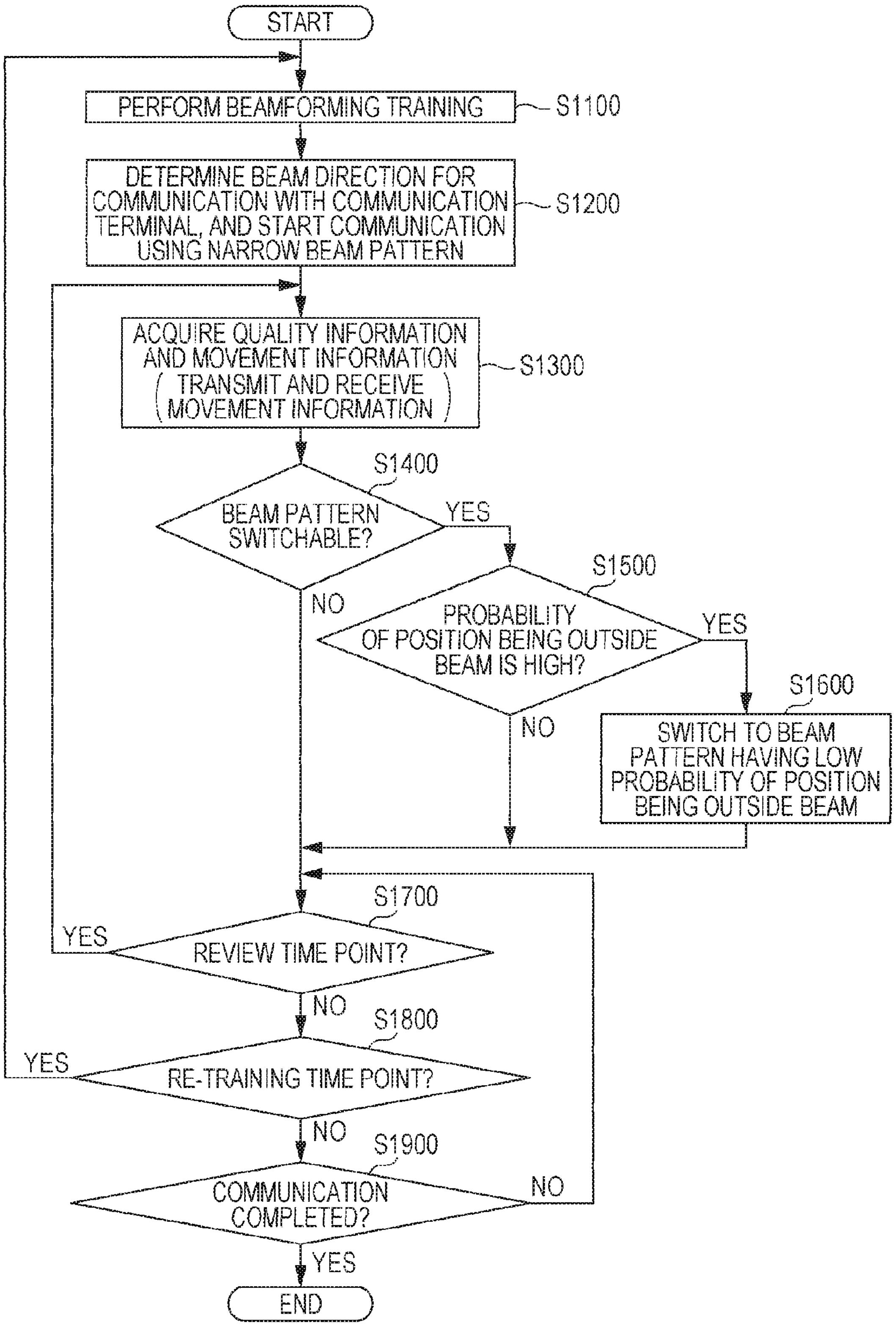
FIG. 18 is a flowchart illustrating an example of the operation performed by the wireless communication apparatus according to the embodiment.

FIG. 18 is a flowchart illustrating an example of the operation performed by the wireless communication apparatus. The wireless communication apparatus 100 performs, for example, the following operation each time a connection request is received from the communication terminal 200.

In step S1100, the quality information acquisition unit 107 performs beamforming training by using the beam control unit 106, the communication unit 122, and the antenna unit 121.

More specifically, the quality information acquisition unit 107 sequentially transmits training signals in the respective beam directions by using all of the antenna elements 101 (refer to FIG. 1). Thereafter, the quality information acquisition unit 107 increases the half-value angle of the beam and receives beam direction information sent back from the communication terminal 200 (refer to FIG. 2).

In step S1200, the quality information acquisition unit 107 determines the beam direction indicated by the received beam direction information as the beam direction used for communication with the communication terminal 200. Thereafter, the quality information acquisition unit 107 starts communication with the communication terminal 200 by using a beam pattern having a narrow half-value angle (that is, a narrow and long beam pattern) in the determined beam direction (refer to FIG. 3). Note that the communication with the communication terminal 200 may be started after beam pattern switching is completed (S1400, S1500, S1600) (described below).

In step S1300, the quality information acquisition unit 107 acquires quality information via the communication performed with the communication terminal 200. In addition, the movement information acquisition unit 123 acquires the movement information from the movement of the wireless communication apparatus 100 or the movement of the communication terminal 200. That is, the movement information acquisition unit 123 and the communication terminal 200 mutually transmit and receive the movement information.

For example, in the case where the quality determination information is the one illustrated in FIGS. 8 to 10, the quality information is the received power of a signal received from the communication terminal 200.

For example, in the case where the movement determination information includes the one illustrated in FIG. 11, the movement information includes the device type of the wireless communication apparatus 100 and the device type of the communication terminal 200. In the case where the movement determination information includes the one illustrated in FIG. 12, the movement information includes the speed of the wireless communication apparatus 100 and the speed of the communication terminal 200. In the case where the movement determination information includes the one illustrated in FIG. 14, the movement information includes the battery-powered operation of the wireless communication apparatus 100 and the battery-powered operation of the communication terminal 200. In the case where the movement determination information includes the one illustrated in FIG. 13, the movement information includes the traffic type of transmission data from the wireless communication apparatus 100 to the communication terminal 200 and the traffic type of transmission data from the communication terminal 200 to the wireless communication apparatus 100.

In step S1400, the beam control unit 106 determines, from the quality determination information, whether the beam pattern used for communication with the communication terminal 200 can be switched on the basis of the acquired quality information. Note that at the same time, it is desirable that the beam control unit 106 determine which type of beam pattern the beam pattern can be changed to.

For example, if the quality determination information is the one illustrated in FIGS. 8 to 10, the beam control unit 106 determines whether beam pattern switching is available in the following manner.

The beam control unit 106 estimates (calculates) the received power after switching for each of the beam patterns on the basis of the difference between the actual received power and the antenna gain first. For example, if the received power at the antenna unit 121 is −60 [dBm], it turns out from the number of used antennas-antenna gain information 420 (refer to FIG. 9) that the antenna gain with a number of used antennas of 16 is 14 [dBi]. Accordingly, the beam control unit 106 estimates the received power of the beam pattern itself as −60−(−14)=−46 [dBm].

In addition, the beam control unit 106 acquires the receive sensitivity (the receivable minimum received power) of the currently adopted MCS on the basis of the MCS-receive sensitivity information 410 illustrated in FIG. 8. For example, in the case of "MCS: 9", the receive sensitivity is −59 [dBm].

Thereafter, the beam control unit 106 estimate (calculates), for each of the beam patterns, the margin of the received power after switching (the margin up to a predetermined allowable minimum value of the reception intensity) on the basis of the acquired sensitivity of the MSC and the estimated received power. For example, in the case of "MCS: 9", "the number of used antennas: 16", and "the received power at the antenna unit: −60 [dBm]", the margin after switching is −46−(−59)=13 [dB]. As illustrated in FIG. 10, in order to switch the number of antennas used to 1, a difference of 15 [dB] or more is necessary. Accordingly, for example, in accordance with FIG. 10, the beam control unit 106 determines that the current beam pattern with a number of antennas used of 16 can be switched to the beam pattern with a number of antennas used of 2.

If switching of the beam pattern is not available (S1400: NO), the processing of the beam control unit 106 proceeds to step S1700 (described below). However, if switching of the beam pattern is available (S1400: YES), the processing of the beam control unit 106 proceeds to step S1500.

In step S1500, the beam control unit 106 determines whether the probability of the position of the communication terminal 200 being outside the beam is high on the basis of the movement determination information by using the acquired movement information.

In the case where the movement determination information is the one illustrated in FIGS. 11 to 14, for example, the beam control unit 106 determines whether the probability of the position of the communication terminal 200 being outside the beam is high and whether switching of the beam pattern is available by performing a determination process described below.

Figure 19:
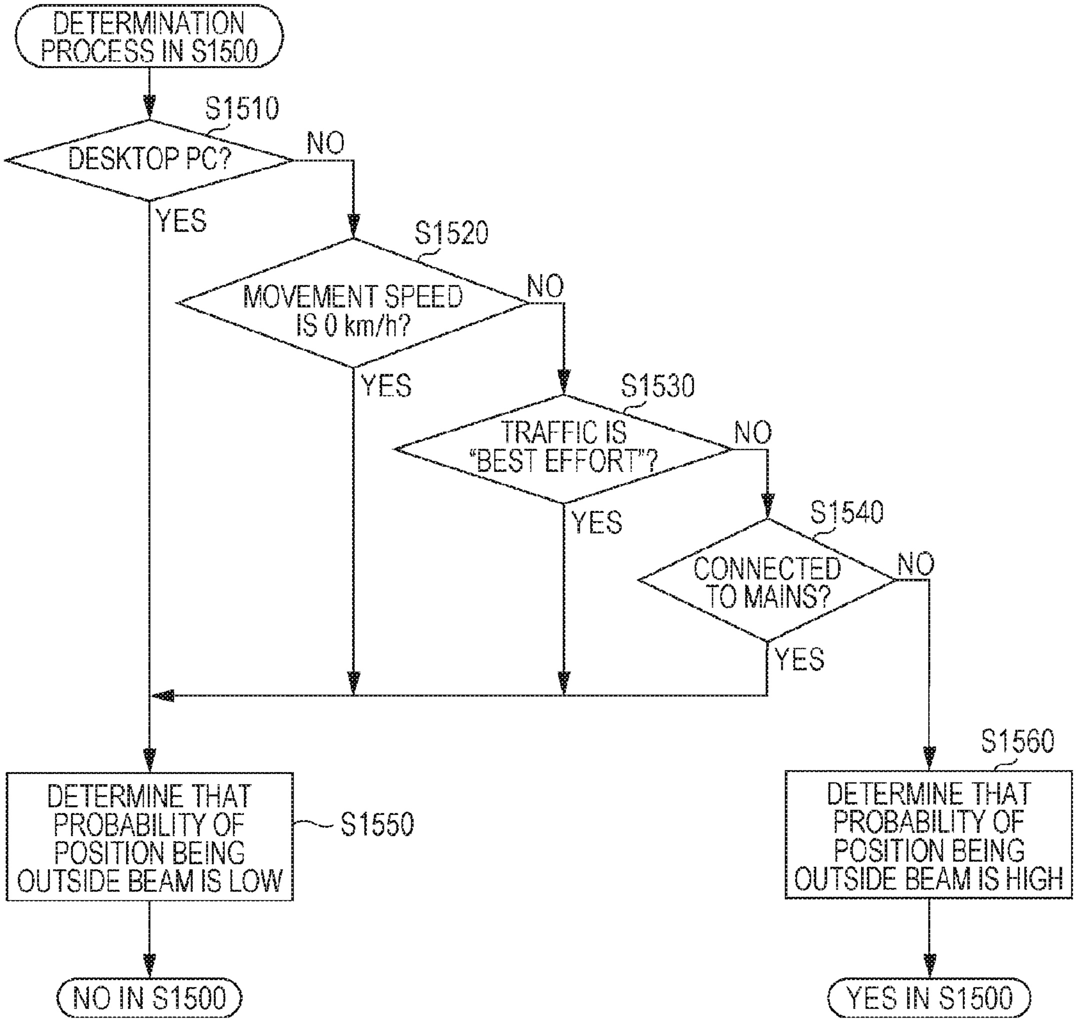
FIG. 19 is a flowchart illustrating an example of a determination process according to the embodiment.

FIG. 19 is a flowchart illustrating an example of the determination process performed in step S1500.

In step S1510, the beam control unit 106 determines whether both the wireless communication apparatus 100 and the communication terminal 200 are desktop PCs on the basis of the device type-movement information 510 illustrated in FIG. 11 by using the acquired movement information. That is, the beam control unit 106 determines whether at least one of the wireless communication apparatus 100 and the communication terminal 200 is a mobile station, such as a notebook PC or a smartphone.

If both the wireless communication apparatus 100 and the communication terminal 200 are desktop PCs (S1510: YES), it is supposed that the terminal does not move and, thus, the processing of the beam control unit 106 proceeds to step S1550 (described below). However, if at least one of the wireless communication apparatus 100 and the communication terminal 200 is not a desktop PC (S1510: NO), the terminal is likely to move. Accordingly, the processing proceeds to step S1520. Note that if it is difficult for the beam control unit 106 to determine the device type of the communication terminal 200, the processing of the beam control unit 106 also proceeds to step S1520.

In step S1520, the beam control unit 106 determines whether the relative speed of the communication terminal 200 with respect to the wireless communication apparatus 100 is 0 [km/h] on the basis of the speed-movement information 520 illustrated in FIG. 12 by using the acquired movement information.

Note that the beam control unit 106 obtains the relative speed by, for example, calculating the difference between the movement vector of the wireless communication apparatus 100 indicated by the movement information of the wireless communication apparatus 100 and the movement vector of the communication terminal 200 indicated by the movement information of the communication terminal 200.

If the relative speed is 0 [km/h] (S1520: YES), the terminal does not move and, thus, the processing of the beam control unit 106 proceeds to step S1550 (described below). However, if the relative speed is not 0 [km/h] (S1520: NO), the terminal is moving and, thus, the processing of the beam control unit 106 proceeds to step S1530. Note that if the movement vector of the communication terminal 200 is unknown, the processing of the beam control unit 106 also proceeds to step S1530.

In step S1530, the beam control unit 106 determines whether the traffic type of communication between the wireless communication apparatus 100 and the communication terminal 200 is "Best Effort" on the basis of the traffic-movement information 530 illustrated in FIG. 13 by using the acquired movement information. That is, the beam control unit 106 determines whether the communication between the wireless communication apparatus 100 and the communication terminal 200 includes communication having a communication type for which disconnection should be particularly avoided (e.g. "Video" or "Voice").

If the traffic type is "Best Effort" (S1530: YES), the beam control unit 106 can relatively allow temporary disconnection. Accordingly, the processing proceeds to step S1550 (described below). However, if the traffic type is not "Best Effort" (S1530: NO), even temporary disconnection is not allowed. Accordingly, the processing of the beam control unit 106 proceeds to step S1540.

In step S1540, the beam control unit 106 determines whether both the wireless communication apparatus 100 and the communication terminal 200 are connected to the mains on the basis of the battery-movement information 540 illustrated in FIG. 14 by using the acquired movement information. That is, the beam control unit 106 determines whether at least one of the wireless communication apparatus 100 and the communication terminal 200 is battery-driven.

When both the wireless communication apparatus 100 and the communication terminal 200 are connected to the mains (S1540: YES), the beam control unit 106 assumes that the terminal is not moving, and consequently the processing proceeds to step S1550 (described below). However, if at least one of the wireless communication apparatus 100 and the communication terminal 200 is not connected to the mains (S1540: NO), the beam control unit 106 assumes that the terminal is moving, and consequently the processing proceeds to step S1560. Note that if the beam control unit 106 cannot determine whether the communication terminal 200 is connected to the mains, the processing of the beam control unit 106 also proceeds to step S1560.

That is, the processing proceeds to step S1560 in the case where at least one of the wireless communication apparatus 100 and the communication terminal 200 is a mobile station and is battery-driven, the relative position is changing, and traffic such as "video" or "voice" is included. Otherwise, the processing of the beam control unit 106 proceeds to step S1550.

In step S1550, the beam control unit 106 determines that the probability of the communication terminal 200 being outside the beam is low.

In contrast, in step S1560, the beam control unit 106 determines that the probability of the communication terminal 200 being outside the beam is high.

If the probability of the communication terminal 200 being outside the beam is low (S1500: NO in FIG. 18), the processing of the beam control unit 106 proceeds to step S1601 (described below). However, if the probability of the communication terminal 200 being outside the beam is high (S1500: YES), the processing of the beam control unit 106 proceeds to step S1600.

In step S1600, the beam control unit 106 switches the beam pattern to a beam pattern with a low probability of the communication terminal 200 being outside the beam. Thereafter, the processing proceeds to step S1700.

For example, in step S1600, the beam control unit 106 determines the beam pattern after switching as follows.

For example, the beam control unit 106 determines whether the communication terminal 200 is moving relative to the wireless communication apparatus 100 in the angular direction by using the movement information.

If a relative movement in the angular direction takes place (refer to FIG. 4A), the beam control unit 106 determines whether there is a beam pattern having a beam half-value angle that is sufficiently wider to ensure the margin of the received power. If at least one of satisfactory beam patterns exists, the beam control unit 106 selects the one satisfactory beam pattern as the beam pattern after switching (refer to FIG. 4B).

If the reception intensity is sufficient, the beam pattern is switched so that the beam half-value angle increases as described above. In this manner, the communication range can be extended. As a result, even when the relative position of the communication terminal 200 is changed, the probability of the communication terminal 200 being outside the beam is low. Thus, by increasing the beamforming training cycle, disconnection of communication caused by the user of the wireless communication apparatus 100 or the communication terminal 200 who suddenly moves can be prevented.

In addition, for example, the beam control unit 106 determines whether the communication terminal 200 is relatively moving in a direction away from the wireless communication apparatus 100 by using the movement information. Note that the beam control unit 106 may periodically perform beamforming training and make such determination on the basis of a change in the position of the communication terminal 200 estimated from a series of training results.

If a relative movement takes place in a direction away from the wireless communication apparatus 100 (refer to FIG. 5A), the beam control unit 106 determines whether there is at least a beam pattern having a narrow beam half-value angle and ensuring the margin of received power. Thereafter, if at least a satisfactory beam pattern exists, the beam control unit 106 selects the one satisfactory beam pattern as the beam pattern after switching (refer to FIG. 5B).

In addition, for example, the beam control unit 106 determines from the movement information whether the communication terminal 200 performs relative movement to be closer to either one of the two end portions of the beam pattern in the angular direction. Note that the beam control unit 106 may periodically perform beamforming training and make such determination on the basis of a change in the position of the communication terminal 200 estimated from a series of training results.

When the communication terminal 200 is performing relative movement to be closer to either one of the two end portions of the beam pattern in the angular direction (refer to FIG. 6A), the beam control unit 106 determines, as the beam pattern after switching, another adjacent beam pattern which overlaps the end portion (refer to FIG. 6B).

By switching the beam pattern so that the beam half-value angle becomes narrow in this manner, the communication distance is extended. Accordingly, even when the communication terminal 200 moves away from the wireless communication apparatus 100, the probability of the communication terminal 200 being outside the beam is low. Thus, by increasing the beamforming training cycle, disconnection of communication can be prevented.

Note that the transmission propagation environment and the reception propagation environment are basically the same. Accordingly, the beam control unit 106 may select the same beam pattern at the time of transmission and at the time of reception. In addition, if the beam control unit 106 has received, from the communication terminal 200, the quality information indicating the reception quality in the communication terminal 200, the beam control unit 106 may determine how much the transmission power can be reduced on the basis of the reception quality and determine the beam pattern after switching.

In step S1700, the beam control unit 106 determines whether a review time point has been reached. At the review time point, the most recent quality information and movement information are re-acquired, and it is determined whether switching of the beam pattern is needed again. For example, the review is performed at predetermined intervals, such as every 1 s.

If the review time point has been reached (S1700: YES), the processing of the beam control unit 106 returns to step S1300. However, if the review time point has not been reached (S1700: NO), the processing of the beam control unit 106 proceeds to step S1800.

In step S1800, the beam control unit 106 determines whether a retraining time point has been reached. At the retraining time point, beamforming training is to be performed again. Examples of the retraining time point include a time point that occurs at predetermined intervals, such as every 10 s, a time point at which the received power from the communication terminal 200 falls below a predetermined threshold, and a time point at which the communication with the communication terminal 200 is disconnected.

If the retraining time point has been reached (S1800: YES), the processing of the beam control unit 106 returns to step S1100. However, if a retraining time point has not been reached (S1800: NO), the processing of the beam control unit 106 proceeds to step S1900.

In step S1900, the beam control unit 106 adaptively switches the beam pattern in response to, for example, a predetermined operation performed by the user. Thereafter, the beam control unit 106 determines whether an instruction to terminate the communication with the communication terminal 200 is received.

If an instruction to terminate the communication has not been received (S1900: NO), the processing of the beam control unit 106 returns to step S1700. However, if an instruction to terminate the communication has been received (S1900: YES), the beam control unit 106 completes the series of processes.

The wireless communication apparatus 100 may perform the processing in steps S1300 to S1600 as part of beamforming training. Alternatively, the wireless communication apparatus 100 may perform the processing in steps S1300 to S1600 after the beamforming training is completed and data communication with the communication terminal 200 is started.

Note that the wireless communication apparatus 100 employs a modulation method for transmitting and receiving training signals at the time of beamforming training, whereas the wireless communication apparatus 100 employs another modulation method for transmitting and receiving data at the time of data communication. Therefore, if the wireless communication apparatus 100 performs the processing in steps S1300 to S1600 after data communication is started, the wireless communication apparatus 100 can determine the beam pattern switching more appropriately.

Through such an operation, the wireless communication apparatus 100 can switch the beam pattern used for communication with the communication terminal 200 on the basis of the quality information and the movement information so that the probability of the position of the communication terminal 200 being outside the beam is low.

Effect of Disclosure

As described above, according to the present embodiment, the wireless communication apparatus 100 switches the beam pattern used for communication with the communication terminal 200 on the basis of the quality information and the movement information so that the probability of the position of the communication terminal 200 being outside the beam is low. In this manner, even when the wireless communication apparatus 100 and the communication terminal 200 move relative to each other (that is, in the case where a mobile body is included in the communication entities), the wireless communication apparatus 100 can increase the throughput of communication with the communication terminal 200. That is, the wireless communication apparatus 100 can reduce the frequency of beamforming training and prevent a decrease in the throughput of communication.

Modification of Disclosure

While the above embodiment has been described with reference to the case where both the wireless communication apparatus 100 and the communication terminal 200 are movable, the present disclosure is not limited thereto.

For example, if it is clear that the wireless communication apparatus 100 does not move, the beam control unit 106 may determine the probability of the position of the communication terminal 200 being outside the beam on the basis of the movement information of the communication terminal 200 and select the beam pattern after switching. In this case, the wireless communication apparatus 100 does not necessarily need to have the movement detection unit 108 and the movement information transmitting unit 109.

Conversely, for example, if it is clear that the communication terminal 200 does not move, the beam control unit 106 may determine the probability of the position of the communication terminal 200 being outside the beam on the basis of the movement information of the wireless communication apparatus 100 and select the beam pattern after switching. In this case, the wireless communication apparatus 100 does not necessarily need to have the movement information receiving unit 110.

In addition, if the movement direction of the relative position of the communication terminal 200 with respect to the wireless communication apparatus 100 is limited, the movement information does not necessarily need to include information about the movement direction. Furthermore, in the case where the movement direction of the relative position is limited to the angular direction, the beam control unit 106 does not necessarily determine a beam pattern to be selected as a beam pattern after switching. That is, the beam control unit 106 may form a narrow-directivity beam pattern in the initial state and uniformly switch the beam pattern to a predetermined beam pattern having wider directivity when a predetermined condition, such as a condition in which movement is detected, is met.

Alternatively, the beam control unit 106 may control the beam pattern on the basis of information other than the relative speed, such as the movement acceleration or he movement pattern of the relative position of the communication terminal 200.

That is, the method for determining the probability of the position of the communication terminal 200 being outside the beam and the method for determining the beam pattern after switching are not limited to the above-described example. For example, the beam control unit 106 may determine whether the probability of the position of the communication terminal 200 being outside the beam is high by using part of the movement determination information illustrated in FIGS. 11 to 14 or by using another movement determination criterion.

More specifically, for example, when the beam control unit 106 assigns priorities to a plurality of pieces of movement determination information and if the beam control unit 106 determines that the probability of the position of the communication terminal 200 being outside the beam is high on the basis of a piece of the movement determination information having a higher priority, the beam control unit 106 need not take into account the movement determination information having a priority lower than that of the movement determination information. That is, for example, if, in step S1510 illustrated in FIG. 19, it is determined that the wireless communication apparatus 100 or the communication terminal 200 is not a desktop PC (S1510: NO), the processing of the beam control unit 106 may proceed to step S1560.

In addition, for example, on the condition that the moving speed is higher than or equal to a predetermined threshold that is higher than 0 km/h, the beam control unit 106 may determine that the probability of the relative position of the communication terminal 200 being outside the beam is high.

Furthermore, the beam control unit 106 may take into consideration the relationship between the direction and the speed. That is, for example, the beam control unit 106 may determine that the probability of the relative position of the communication terminal 200 being outside the beam in the angular direction is high on the condition that the moving speed that is higher than or equal to the predetermined threshold is a speed in the angular direction. Thus, the beam half-value angle may be increased. Alternatively, the beam control unit 106 may determine that the probability of the relative position of the communication terminal 200 being outside the beam in the range direction is high on the condition that the moving speed that is higher or equal to the predetermined threshold is a speed in the range direction. Thus, the beam half-value angle may be decreased.

In addition, the beam control unit 106 may determine the relative position of the communication terminal 200 by using a method other than the above-described method. For example, the beam control unit 106 may periodically perform beamforming training and make such determination on the basis of a change in the position of the communication terminal 200 estimated from a series of training results. In this case, the training result or the change in the position of the communication terminal 200 estimated from the training result can be regarded as the movement information.

More specifically, in the beamforming training performed by the wireless communication apparatus 100 at a certain time point, it is supposed that the communication terminal 200 is located inside of the beam of an (n−1)th beam pattern $\mathbf{316}_{n-1}$ (refer to FIG. 3). In addition, in the beamforming training performed by the wireless communication apparatus 100 at the next time point, it is supposed that the communication terminal 200 is located inside of the beam of the n-th beam pattern $\mathbf{316}_n$. From the above results, the wireless communication apparatus 100 can estimate how far the communication terminal 200 has moved in the angular direction relative to the wireless communication apparatus 100 by using the training period and the switching angle of the antenna.

When the communication terminal 200 controls the beam pattern in the same manner as the wireless communication apparatus 100, it is desirable that the beam control unit 106 perform control so that one of the wireless communication apparatus 100 and the communication terminal 200 does not perform switching of the beam pattern (for example, the switching as illustrated in FIGS. 4A to 6B). This is because if, for example, the communication terminal 200 similarly switches the beam pattern in step S1600 after the terminal device 100 switches the beam pattern in step S1600, communication disconnection occurs. The control of the switching time point of the beam pattern is accomplished by, for example, the wireless communication apparatus 100 transmitting a signal for controlling the switching time point of the beam pattern to the communication terminal 200. In this manner, disconnection of communication caused by both the wireless communication apparatus 100 and the communication terminal 200 switching the communication environments can be prevented.

In addition, the method for acquiring the quality information and the method for acquiring the movement information of the wireless communication apparatus 100 are not limited to the above example. For example, the movement detection unit 108 may detect a change in the relative position of the communication terminal 200 by determining whether the optimum beam direction has changed by using the results of beamforming training performed a plurality of times.

In addition, the number of antenna elements 101 of the antenna unit 121 and the beam patterns that the antenna unit 121 can form are not limited to the above example. As the number of the antenna elements 101 increases, the number of beam patterns that can be formed increases. Thus, the frequency of beamforming training can be further reduced.

In addition, some part of the configuration of the wireless communication apparatus 100 may be physically separated from the other part of the configuration of the wireless communication apparatus 100 and may be disposed in a server or the like on the Internet. In this case, the parts need to have a communication circuits for communicating with each other.

Note that in the determination of movement, the beamwidth can be further taken into consideration as a recommended behavior.

FIG. 20 is a diagram illustrating an example of the details of the recommended behavior.

As illustrated in FIG. 20, the recommended behavior-movement information 550 describes the presence of movement 553, a subsequent step S54, and a beam pattern 555 for each of a current beamwidth 551 and a recommended behavior 552. The current beamwidth 551 indicates the current beamwidth of the wireless communication apparatus 100 or the communication terminal 200. The recommended behavior 552 indicates whether the wireless communication apparatus 100 or the communication terminal 200 recommends the communication partner to widen the beam (FIG. 4B) or narrow the beam (FIG. 4A).

The presence of movement 553 indicates whether the probability of the position of the wireless communication apparatus 100 or the communication terminal 200 moving out of the beam is high. For example, the recommended behavior-movement information 550 describes that the presence of movement 553 is "YES" (the probability of movement is high) in association with the recommended behavior 552 "Wide Beam".

The subsequent step S54 indicates the sequence number of the next step. The beam pattern 555 indicates how to change the beam pattern at the next step and after the next step.

Figure 21:
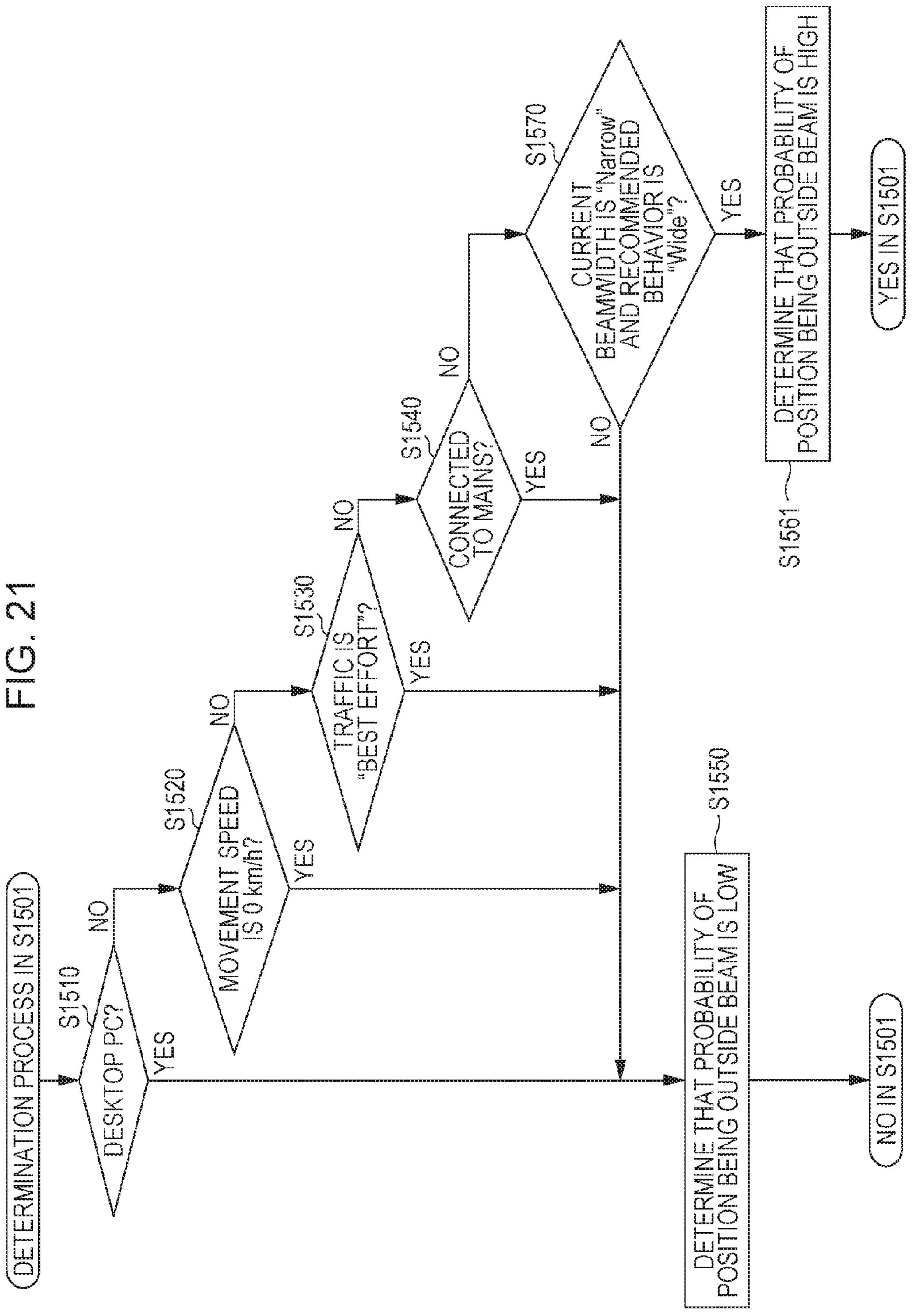
FIG. 21 is a flowchart illustrating an example of the determination process in accordance with a recommended behavior according to the embodiment.

FIG. 21 is a flowchart illustrating an example of a determination process in accordance with the recommended behavior. In the example, step S1570 related to the recommended behavior is added to the flowchart illustrating an example of the determination process performed in step S1500 illustrated in FIG. 19. Description of steps that are similar to the steps in FIG. 19 are not repeated.

In FIG. 21, step 1570 for determining the recommended behavior is added after a second stage to be performed in the case where it is presumed that there is movement in step 1540 (S1540: NO).

In step 1570, the beam control unit 106 determines from the acquired movement information whether the wireless communication apparatus 100 or the communication terminal 200 widens or narrows the beam on the basis of the recommended behavior-movement information 550 illustrated in FIG. 20.

When the current beamwidth 551 of the wireless communication apparatus 100 or the communication terminal 200 is narrow and "Wide Beam" is set in the recommended behavior 552 (S1570: YES), the beam control unit 106 can determine that the communication partner is moving. Accordingly, the processing proceeds to step S1561.

Subsequently, if the current beamwidth 551 of the wireless communication apparatus 100 or the communication terminal 200 is narrow and "Narrow Beam" is set in the recommended behavior 552 (S1570: NO), it can be determined that the communication partner is not moving. Thus, the processing proceeds to step S1550.

If the current beamwidth 551 of the wireless communication apparatus 100 or the communication terminal 200 is wide and "Wide Beam" is set in the recommended behavior 552 (S1570: NO), it can be determined that the communication partner is moving. However, since the current beamwidth is already increased, the processing proceeds to step S1550.

In addition, if the current beamwidth 551 of the wireless communication apparatus 100 or the communication terminal 200 is wide and the "Narrow Beam" is set in the recommended behavior 552 (S1570: NO), it can be determined that the communication partner is not moving. Thus, the processing proceeds to step S1550.

Figure 22:
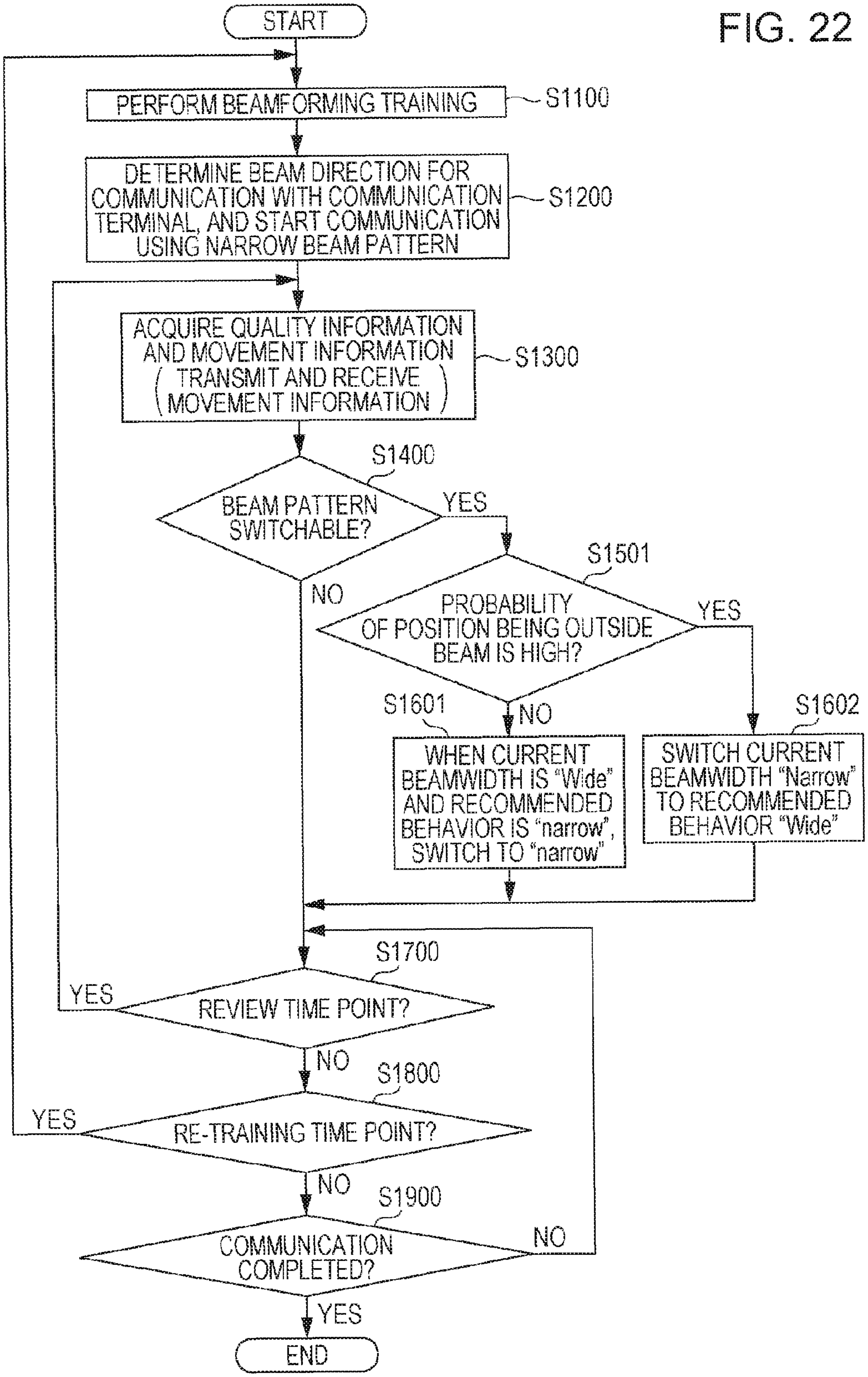
FIG. 22 is a flowchart illustrating an example of the operation performed by the wireless communication apparatus in accordance with the recommended behavior.

FIG. 22 is a flowchart illustrating an example of the operation performed by the wireless communication apparatus in accordance with the recommended behavior. Description of the same steps as in the flowchart illustrated in FIG. 18 are not repeated.

If, in step S1501, it is determined that the probability of the communication terminal being outside the beam is high, that is, if the current beamwidth is "Narrow Beam" and the recommended motion is "Wide Beam" (YES in S1501), the beam control unit 106 changes the beam pattern to "Wide Beam" in accordance with FIG. 20 (S1602).

If, in step S1501, it is determined that the probability of the communication terminal being outside the beam is low and if the current beamwidth is "Wide Beam" and the recommended behavior is "Narrow Beam", the beam control unit 106 changes the beam pattern to "Narrow Beam" in accordance with FIG. 20 (S1601).

In the case where no relative movement in the angular direction takes place (refer to FIG. 3), the beam control unit 106 determines whether there is a beam pattern having a beam half-value angle narrower than that of the beam pattern currently used (Narrow Beam). Thereafter, if at least one narrower beam pattern exists, the beam control unit 106 selects the one narrower beam pattern as the beam pattern after switching.

When the beam pattern is set so that the beam half-value angle decreases, the received power increases. Therefore, stable communication can be performed with the communication terminal 200.

Note that the transmission propagation environment and the reception propagation environment are basically the same. Therefore, the beam control unit 106 may use the same beam pattern at the time of transmission and at the time of reception.

As the frame format, any one of the following formats can be employed: DMG Link Margin element format, Measurement Request element format (Measurement Report element format), and Information Request frame Action field format (Information Response frame Action field format). In this manner, the wireless communication apparatus 100 can obtain, for example, the recommended behavior and the speed information at the time of communication from the communication partner or can provide the information to the communication partner.

FIG. 23 illustrates an example of a description area of the movement information when the DMG Link Margin element format 640 of IEEE 802.11 (Part 11: Wireless LAN Medium Access Control (MAC) and Physical Layer (PHY) Specifications) is employed.

For example, as illustrated in FIG. 23, the wireless communication apparatus 100 or the communication terminal 200 writes, as movement information, a mobility category into Reserved 641 of the "Activity" field in the DMG Link Margin element format 640. The Activity field is a field for notifying the communication partner of the recommended behavior at the time of communication. "7: Wide Beam, 8: Narrow Beam" is defined in advance in Reserved 641 in accordance with, for example, the presence or absence of the movement of the wireless communication apparatus 100 or the communication terminal 200.

FIG. 24 illustrates an example of a description area of the movement information when a Measurement Request element format 650 of IEEE 802.11 (Part 11: Wireless LAN Medium Access Control (MAC) and Physical Layer (PHY) Specifications) is employed as a format, and FIG. 25 illustrates an example of a description area of the movement information when the Measurement Report element format 652 is employed as a format.

As illustrated in FIG. 24, for example, the wireless communication apparatus 100 writes, as movement information, a mobility category into Reserved 651 of the Measurement Type field in the Measurement Request element format 650. The Measurement Type field is a field for describing measurement items required for the communication terminal 200 with which the wireless communication apparatus 100 communicates. In Reserved 651, for example, "16: Moving Speed Measurement" is defined in advance when the speed information is acquired.

Subsequently, as illustrated in FIG. 25, for example, the wireless communication apparatus 100 receives a format in which a mobility category is set forth as movement information in Reserved 653 of the Measurement Type field in the Measurement Report element format 652. For example, in the case of the acquisition result of the speed information, "16: Moving Speed Measurement" is defined in advance. As the details of the acquisition result of the speed information, the speed information is stored in the measurement report 654. Note that speed information at the latitude, longitude, and altitude may be stored. Instead of the speed information itself, the location information may be acquired a plurality of times, and the speed of the terminal may be calculated from the difference between the movement amount and the acquisition time.

FIG. 26 illustrates an example of a description area of the movement information when the information request frame action field format 660 and the information response frame action field format 660 of the IEEE 802.11 (Part 11: Wireless LAN Medium Access Control (MAC) and Physical Layer (PHY) Specifications) is employed.

For example, as illustrated in FIG. 26, in the wireless communication apparatus 100, Measurement Request element format 650 or Measurement Report element A format 652 is defined in advance in IE Provided (optional) 661 of the Information Request frame Action field format 660 or Information Response frame Action field format 660 in order to acquire the speed information.

Summary of Disclosure

According to the present disclosure, a wireless communication apparatus includes an antenna unit that switches between a plurality of beam patterns by using a plurality of antenna elements, a communication unit that performs wireless communication with a communication terminal by using the antenna unit, a quality information acquisition unit that acquires quality information indicating a communication quality of the wireless communication, a movement information acquisition unit that acquires movement information indicating movement of a relative position of the communication terminal with respect to the antenna unit, and a beam control unit that controls the beam pattern to be switched by the antenna unit on the basis of the acquired quality information and movement information.

Note that in the above-described wireless communication apparatus, the quality information may indicate the reception intensity of a signal transmitted from the communication terminal and received by the antenna unit. If a margin to an allowable minimum value of the reception intensity is greater than or equal to a first threshold value, a half-value angle of the current beam pattern may be increased.

In addition, in the above-described wireless communication apparatus, the beam control unit may determine whether the probability of the relative position of the communication terminal being outside the beam pattern during the wireless communication is high on the basis of the quality information and the movement information. If the probability of the position being outside the beam pattern is high, the beam control unit may switch the beam pattern.

In addition, in the above-described wireless communication apparatus, the beam control unit may switch the beam pattern to a beam pattern having a low probability of the relative position of the communication terminal being outside the current beam pattern on the basis of the quality information and the movement information.

In addition, in the above-described wireless communication apparatus, the movement information may indicate whether there is movement of a relative position of the communication terminal with respect to the antenna unit. If there is movement of the relative position of the communication terminal, the beam control unit may determine that the probability of the communication terminal being outside the beam pattern is high.

In addition, in the above-described wireless communication apparatus, the movement information may indicate a relative moving speed of the communication terminal with respect to the antenna unit. On the condition that the moving speed is higher than or equal to a second threshold value, the beam control unit may determine that the probability of the position being outside the beam pattern is high.

In addition, in the above-described wireless communication apparatus, the antenna unit may be capable of switching the beam pattern in a predetermined angular direction, and the movement information may indicate a relative moving speed of the communication terminal with respect to the antenna unit in the angular direction. On the condition that the moving speed in the angular direction is higher than or equal to a third threshold value, the beam control unit may determine that the probability of the position being outside the beam pattern is high and increase the beam half-value angle of the antenna unit.

In addition, in the above-described wireless communication apparatus, the movement information may indicate a relative moving speed of the communication terminal with respect to the antenna unit in a range direction. On the condition that the moving speed in the range direction is higher than or equal to a fourth threshold value, the beam control unit may determine that the probability of the position being outside the beam pattern is high and decrease the beam half-value angle of the antenna unit.

In addition, in the above-described wireless communication apparatus, the movement information may indicate at least one of traffic of the wireless communication, information as to whether an implemented function of at least one of the communication terminal and the wireless communication apparatus is used, the device type of at least one of the communication terminal and the wireless communication apparatus, and information as to whether power supply is supplied to at least one of the communication terminal and the wireless communication apparatus.

In addition, in the above-described wireless communication apparatus, the movement information acquisition unit may receive at least part of the movement information from the communication terminal via the antenna unit.

According to the present disclosure, a wireless communication control method for use of a wireless communication apparatus is provided. The wireless communication apparatus includes an antenna unit that switches between a plurality of beam patterns by using a plurality of antenna elements and a communication unit that performs wireless communication with a communication terminal by using the antenna unit. The method includes acquiring quality information indicating a communication quality of the wireless communication, acquiring movement information indicating movement of a relative position of the communication terminal with respect to the antenna unit, and controlling the beam pattern to be switched by the antenna unit on the basis of the acquired quality information and movement information.

While various embodiments have been described with reference to the accompanying drawings, it should be noted that the present disclosure is not limited to such embodiments. It will be apparent to those skilled in the art that a variety of changes and modifications can be made within the scope described in the claims, and the changes and modifications are encompassed within the technical scope of the disclosure. In addition, the constituent elements of the above-described embodiments may be combined in any way within the spirit and scope of the disclosure.

In the above-described embodiments, while the present disclosure has been described with reference to an example of the configuration using hardware, the present disclosure can also be realized by software in cooperation with hardware.

In addition, the functional blocks used in the description of the above embodiment are typically implemented as LSIs, which are integrated circuits having an input terminal and an output terminal. The functional blocks may be formed as individual chips, or some or all of the functional blocks may be integrated into a single chip. The term "LSI" is used herein, but the terms "IC", "system LSI", "super LSI" or "ultra LSI" may be used as well depending on the level of integration.

In addition, the circuit integration is not limited to LSI and may be achieved by dedicated circuitry or a general-purpose processor other than an LSI. An FPGA (field programmable gate array), which is programmable after fabrication of the LSI, or a reconfigurable processor which allows reconfiguration of connections and settings of circuit cells in LSI may be used.

Moreover, should a circuit integration technology replacing LSI appear as a result of advancements in semiconductor technology or other technologies derived from the technology, the functional blocks could be integrated using such a technology. Another possibility is the application of biotechnology, for example.

The wireless communication apparatus and the wireless communication control method according to the present disclosure are useful as a wireless communication apparatus and a wireless communication control method capable of improving the throughput of communication even when a mobile body is included in communication entities.

What is claimed is:

1. A wireless communication apparatus comprising:

an antenna, which, in operation, changes a beam pattern by using a plurality of antenna elements;

a communicator, which, in operation, performs wireless communication with a communication terminal by using the antenna;

quality information acquisition circuitry, which, in operation, acquires quality information indicating a communication quality of the wireless communication, wherein the quality information indicates a reception intensity of a signal transmitted from the communication terminal and received by the antenna;

movement information acquisition circuitry, which, in operation, acquires movement information indicating movement of a relative position of the communication terminal with respect to the antenna; and beam control circuitry, which, in operation, controls the beam pattern to be changed by the antenna on the basis of the acquired quality information and movement information, wherein if a margin to an allowable minimum value of the reception intensity is greater than or equal to a first threshold value, a half-value angle of the beam pattern is increased.

2. The wireless communication apparatus according to claim 1, wherein the beam control circuitry, in operation, determines whether or not a probability of a relative position of the communication terminal being outside the beam pattern is high during the wireless communication, on the basis of the quality information and the movement information, and wherein if the probability of the position being outside the beam pattern is high, the beam control circuitry, in operation, changes the beam pattern.

3. The wireless communication apparatus according to claim 2, wherein the beam control circuitry, in operation, changes, on the basis of the quality information and the movement information, the beam pattern to a beam pattern having a low probability of the relative position of the communication terminal being outside the beam pattern changed by the beam control circuitry.

4. The wireless communication apparatus according to claim 3, wherein the movement information indicates whether a relative position of the communication terminal with respect to the antenna is moving or not, and wherein if the relative position of the communication terminal is moving, the beam control circuitry, in operation, determines that the probability of the communication terminal being outside the beam pattern is high.

5. The wireless communication apparatus according to claim 3, wherein the movement information indicates a relative moving speed of the communication terminal with respect to the antenna, and wherein if the relative moving speed is higher than or equal to a second threshold value, the beam control circuitry, in operation, determines that the probability of the position being outside the beam pattern is high.

6. The wireless communication apparatus according to claim 3, wherein the antenna changes the beam pattern in a determined angular direction, wherein the movement information indicates a relative moving speed of the communication terminal with respect to the antenna in the angular direction, and wherein if the relative moving speed in the angular direction is higher than or equal to a second threshold value, the beam control circuitry, in operation, determines that the probability of the position being outside the beam pattern is high and increases the beam half-value angle of the antenna.

7. The wireless communication apparatus according to claim 3, wherein the movement information indicates a relative moving speed of the communication terminal with respect to the antenna in a range direction, wherein if the relative moving speed in the range direction is higher than or equal to a second threshold value, the beam control circuitry, in operation, determines that the probability of the position being outside the beam pattern is high and decreases the beam half-value angle of the antenna.

8. The wireless communication apparatus according to claim 3, wherein the movement information indicates at least one of:

traffic of the wireless communication;

whether or not an implemented function of at least one of the communication terminal and the wireless communication apparatus is used;

a device type of at least one of the communication terminal and the wireless communication apparatus; and whether or not power supply is supplied to at least one of the communication terminal and the wireless communication apparatus.

9. The wireless communication apparatus according to claim 3, wherein the movement information acquisition circuitry, in operation, receives at least part of the movement information from the communication terminal via the antenna.

10. The wireless communication apparatus according to claim 1, wherein the antenna changes the beam pattern by switching among a plurality of beam patterns.

11. A wireless communication control method for use of a wireless communication apparatus comprising:

changing a beam pattern of an antenna by using a plurality of antenna elements;

communicating with a communication terminal by using the antenna in wireless communication;

acquiring quality information indicating a communication quality of the wireless communication, wherein the quality information indicates a reception intensity of a signal transmitted from the communication terminal and received by the antenna;

acquiring movement information indicating movement of a relative position of the communication terminal with respect to the antenna; and controlling the beam pattern to be changed by the antenna on the basis of the acquired quality information and movement information, wherein if a margin to an allowable minimum value of the reception intensity is greater than or equal to a first threshold value, a half-value angle of the beam pattern is increased.

* * * * *